United States Patent
Mondiot

(10) Patent No.: US 12,504,652 B2
(45) Date of Patent: Dec. 23, 2025

(54) LIQUID-CRYSTAL OPTICAL SYSTEM

(71) Applicants: SAINT-GOBAIN GLASS FRANCE, Courbevoie (FR); CENTRE NATIONAL DE LA RECHERCHE SCIENTIFIQUE, Paris (FR)

(72) Inventor: Frédéric Mondiot, Aubervilliers (FR)

(73) Assignees: SAINT-GOBAIN GLASS FRANCE, Courbevoie (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 0 days.

(21) Appl. No.: 18/698,635

(22) PCT Filed: Oct. 5, 2022

(86) PCT No.: PCT/FR2022/051882
§ 371 (c)(1),
(2) Date: Apr. 4, 2024

(87) PCT Pub. No.: WO2023/057721
PCT Pub. Date: Apr. 13, 2023

(65) Prior Publication Data
US 2024/0427176 A1    Dec. 26, 2024

(30) Foreign Application Priority Data
Oct. 6, 2021 (FR) .................... 2110591

(51) Int. Cl.
*G02F 1/01* (2006.01)
*G02F 1/1335* (2006.01)
(Continued)

(52) U.S. Cl.
CPC ...... *G02F 1/0136* (2013.01); *G02F 1/133528* (2013.01); *G02F 1/13439* (2013.01); *G02F 1/13756* (2021.01); *G02F 2202/04* (2013.01)

(58) Field of Classification Search
None
See application file for complete search history.

(56) References Cited

U.S. PATENT DOCUMENTS

2012/0140133 A1\* 6/2012 Choi ................ G02F 1/134363
349/33
2013/0093969 A1\* 4/2013 Li ........................ G02F 1/13718
349/16
2013/0265511 A1\* 10/2013 Poix .................. B32B 17/10045
349/33

FOREIGN PATENT DOCUMENTS

EP    EP 0 844 075 A1    5/1998
WO    WO 2004/025334 A2    3/2004
(Continued)

OTHER PUBLICATIONS

International Search Report as issued in International Patent Application No. PCT/FR2022/051882, dated Feb. 21, 2023.

*Primary Examiner* — Phu Vu
(74) *Attorney, Agent, or Firm* — Pillsbury Winthrop Shaw Pittman LLP

(57) ABSTRACT

A liquid crystal optical system includes a variable polarization electro-switchable device forming a variable polarizer, the variable polarizer including first and second transparent electrodes with an electric field between the first and second electrodes, the first and second electrodes are coplanar, forming an alternation of first and second electrically conductive strips—at distinct potentials, and an electroactive layer made of a material including liquid crystals which are nematic and dichroic dyes.

19 Claims, 10 Drawing Sheets

(51) Int. Cl.
*G02F 1/1343* (2006.01)
*G02F 1/137* (2006.01)

(56) References Cited

FOREIGN PATENT DOCUMENTS

| WO | WO 2015/177356 A1 | 11/2015 |
| WO | DR WO 2020/065038 A1 | 4/2020 |
| WO | WO 2021/115246 A1 | 6/2021 |

* cited by examiner

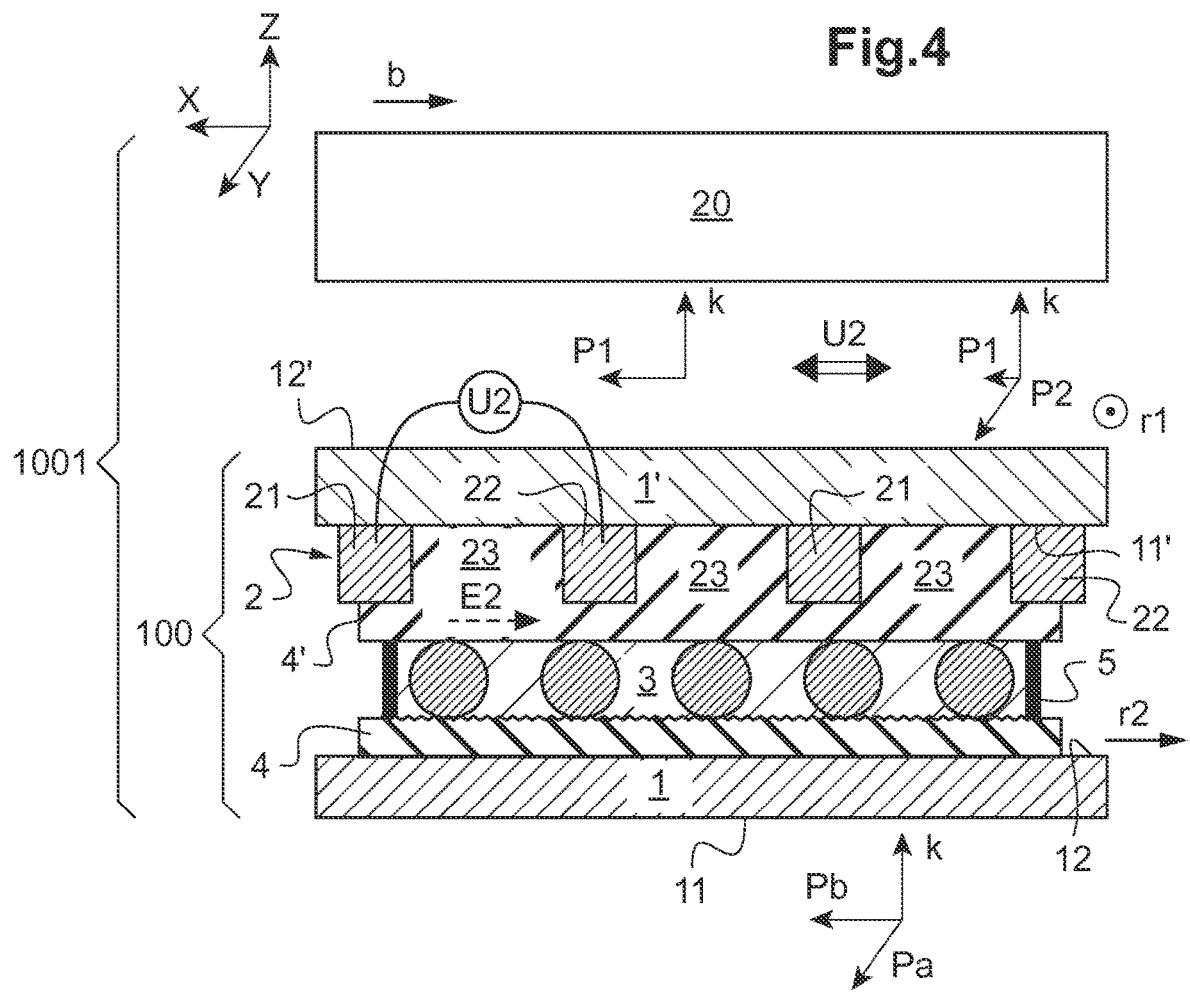

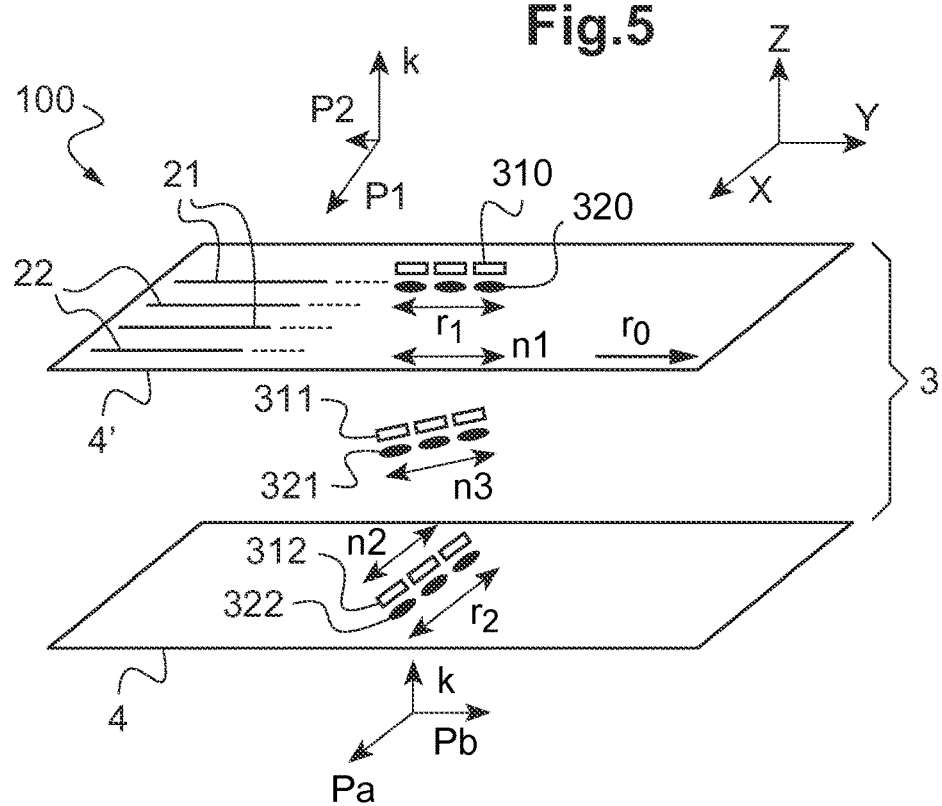
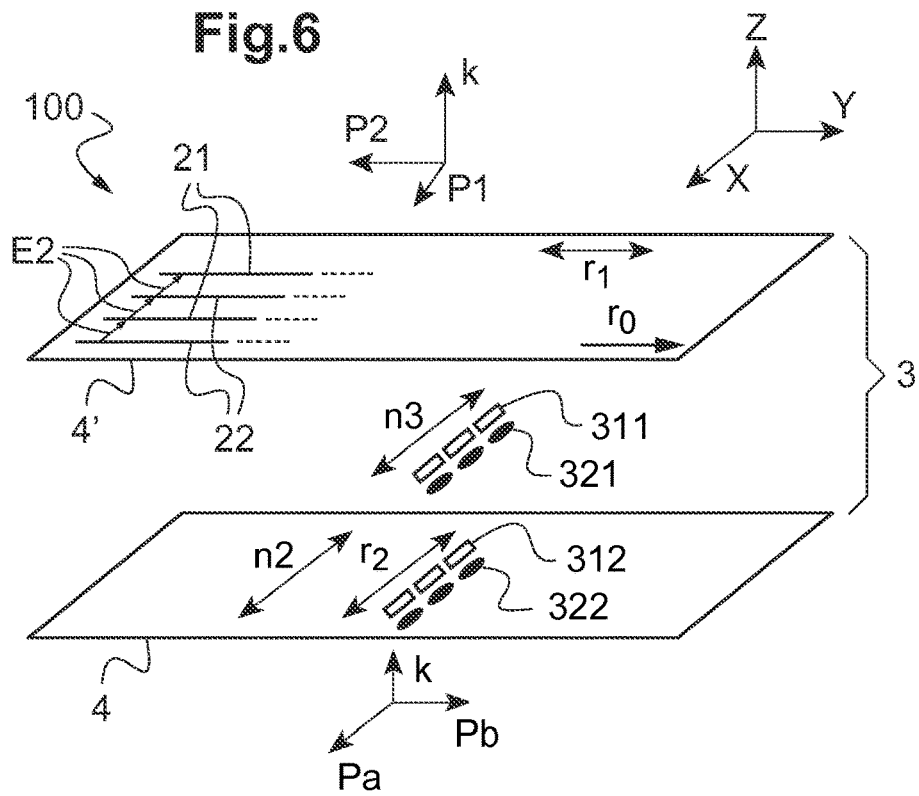

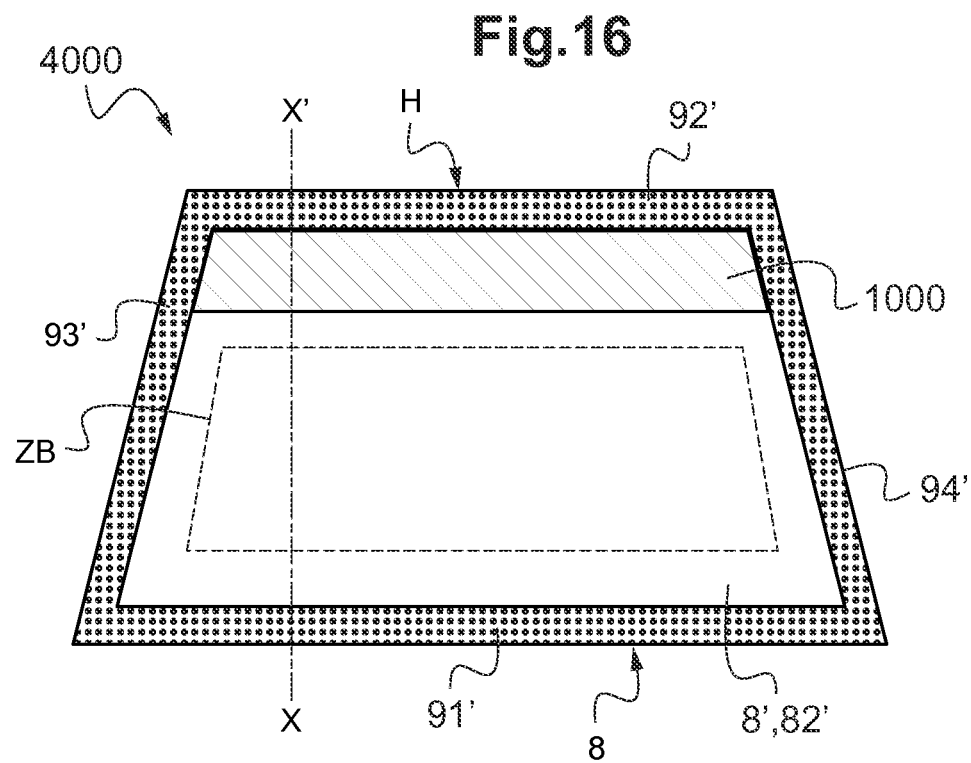
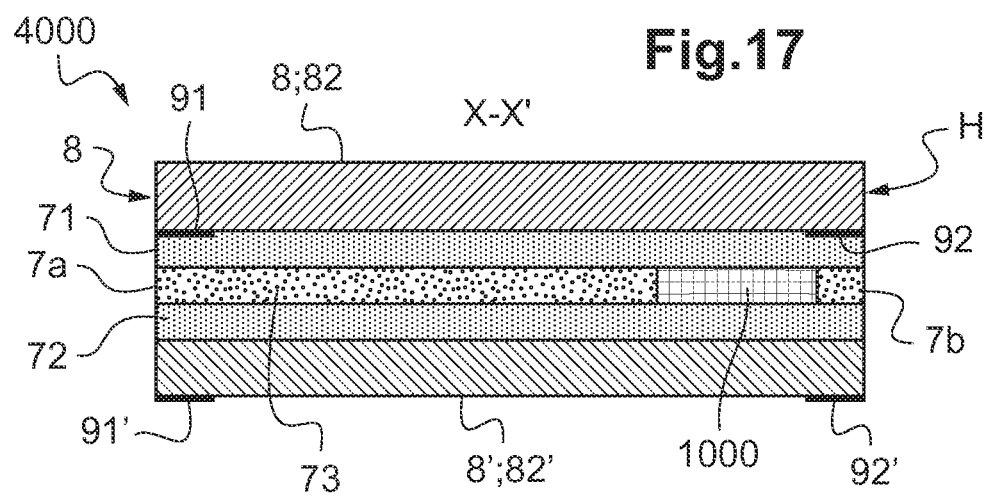

LIQUID-CRYSTAL OPTICAL SYSTEM

CROSS-REFERENCE TO RELATED APPLICATIONS

This application is the U.S. National Stage of PCT/FR2022/051882, filed Oct. 5, 2022, which in turn claims priority to French patent application number 2110591 filed Oct. 6, 2021. The content of these applications are incorporated herein by reference in their entirety.

The invention relates to a liquid crystal optical system comprising a device electrically controllable by liquid crystals.

Liquid crystal systems exist in the form of first and second electroactive liquid crystal cells facing one another making it possible either to allow light to pass through or to block it.

One object of the invention consists in developing a liquid crystal system with alternating electro-optical properties or even offering new functionalities.

For this purpose, the present invention proposes a liquid crystal optical system comprising an electroswitchable device with variable polarization (in transmission), called a variable polarizer, comprising:

- first transparent electrodes, with an electric field E2 between the first and second electrodes, in particular in the form of electrically conductive layers on common carrier element (coplanar configuration), the first and second electrodes (preferably in a layer) being coplanar (preferably on a common carrier element rather than self-supporting), forming an alternation of first and second electrically conductive strips (metal, for example) with distinct potentials, in particular elongated strips (linear, preferably rectilinear) in a direction r0,
- an electroactive layer being of submillimetric thickness and even of at most 100 μm and of at least 50 nm, in particular of 50 nm to 50 μm and even of 100 nm to 20 μm and better still of at least 1 μm or 5 μm, the electroactive layer being made of a thermotropic material (preferably) containing (or consisting of):
- liquid crystals (preferably thermotropic) which are nematic, curved or not, preferably twisted (by the action of anchor layers), electrically unpowered in the off state and/or cholesteric-(preferably predominant by weight in the material (preferably at least 50%, 70%, 80%, 85% by weight of said liquid crystals), in particular liquid crystals comprising mesogens, for example without polymer chain or which are groups incorporated in a main chain or side chain of a polymer (family referred to as "LCP"), in particular liquid crystals of a size of at most 50 nm, 20 nm or 10 nm (and less than $Ep_2$), in particular a mixture of several liquid crystals (pure, in the sense of not being LCP), therefore several mesogens
- dichroic dyes (in particular in the dissolved state, in particular in liquid crystals), for example at most 30%, 20%, 10%, 5% by weight of dichroic dye (one or more dichroic dyes), which dichroic dye is in particular of a size of at most 50 nm, 20 nm or 10 nm (and less than $Ep_2$); in particular, liquid crystals and dichroic dye are of comparable sizes, for example each of less than 20 or 10 nm,
- optionally polymers (non-crosslinked, preferably) or polymer precursor preferably with at most 20%, 15%, 10%, 5% or 1% by weight of polymer (or polymers and polymer precursors), for example the electroactive layer not being of the type (PDLC or PSLC)
- preferably, spacers, in particular of a height (and even of a larger dimension) of less than or equal to Ep2, at the periphery (dielectric, transparent or not, optionally masked by a frame, for example made of mylar, etc.) and/or dispersed in the electroactive layer (dielectric, transparent, in particular plastic, glass, silica, preferably sub-centimetric, in particular beads)
- optionally other additives (other than the dichroic dyes), for example coloring particles such as metal nanoparticles (gold, silver, alloy of both, etc.) or metal oxide nanoparticles (tungsten oxide, tin oxide, etc.) or even any other non-dichroic dye or any other light-absorbing molecule, preferably of a height of less than or equal to Ep2 (and even of a larger dimension of less than or equal to Ep2).

Preferably, the electroswitchable electroactive layer is sealed at the periphery by a dielectric seal which is in particular polymeric (at the edge of the main faces, in contact with the material (or separated by a peripheral spacer).

Thus designed, the variable polarizer in a first functional state which is the off state, is capable of delivering a polarized light with a polarization P1 (dominant) and in a second functional state which is the on state, is capable of delivering a polarized light with a second polarization P2 distinct from P1 (preferably dominant).

The invention applies in various fields, in particular in the building (window, partition, glazed floor), in particular in urban space, or in a road, sea, rail, or airborne vehicle (windshield, side roof, sunroof, etc.).

When incorporated into a building or vehicle glazing, the other device may either be oriented outward or inwardly.

The variable polarizer itself does not need polarizer(s), for example crossed polarizer and analyzer, to operate. In particular, the variable polarizer may be devoid of static polarizing films.

The switching time of the variable polarizer may be less than a few seconds. The switching states of the optical system are reversible and (quasi) immediate.

The variable polarizer needs only one layer of liquid crystals (single-cell system) and not several layers of liquid crystals to form a variable polarizer.

Optical properties of the optical system may be adjustable:
- by switching off or applying the electric field E2 (preferably alternating) and by choosing the voltage level U2
- by choosing the orientation of the output (dominant) polarization called P1 relative to a characteristic direction b of another polarization-sensitive device as detailed later, in particular P1 substantially parallel or substantially perpendicular to b.

Regarding the variable polarizer, the dichroic dyes, slaved to the liquid crystals, preferably twisted in the off state, play a key role in providing the variable polarization function. The variable polarizer with variable polarization is preferably transparent has a haze of at most 10% or 1% or 0.5% in both the off state and the on state.

U2 may be less than 120 V or even 80 V.

It is possible to apply U2 (and even to choose the level of U2) as a function of a setpoint. Thus, means for controlling the variable polarizer can be provided.

The optical system may have a thickness of at most 1 cm or 5 mm or 1 mm.

The variable polarizer may have a thickness of at most 5 mm or 1 mm or 0.5 mm.

The first and second electrodes (preferably in layers) are coplanar, resulting in planar switching.

The parameters influencing the optical properties are in particular:
- selecting liquid crystals in particular from the mixture of mesogens (in particular for the working temperature range and the reduction in the voltage level in the on state) and their dielectric anisotropy
- the level of transparency of the electrodes with the lowest possible absorption (of their substrate if any), and in the case of electrodes in strips, the density of the strips (in order to lower the electrical voltage by reducing the space between strips and to reduce the zones without switching the liquid crystals to increase the off/on contrast)
- selecting dichroic dyes (the dichroic ratio, etc.) in particular to have a highest and constant absorption spectrum in the visible range
- the thickness of electroactive layer.

The optical characterization of the optical system according to the invention is done on either side.

However, the light leaving the side with the electrodes in strips (along r0) is polarized more according to P1 (normal to 0 and with preferably a unidirectional anchoring layer along r1 parallel to r0 on the electrodes in strips) and more according to P2 when leaving the side with the electrodes in strips. This may be a plastic (stretched) film with dichroic dyes.

The first (respectively the second) electrode can comprise (or even consist of) an electrically conductive layer (monolayer or multilayer, in particular deposit(s)), in particular mineral, in particular of a thickness of at most 200 nm (on a carrier element, preferably an electrically conductive layer between carrier element and anchoring layer), in particular comprising a means for supplying current (strip-busbar-particularly made of metal, copper, silver, etc.) at the edge.

Preferably, the density of electroconductive strips is the greatest possible (strips of width as small as possible and with the smallest possible space between strips).

Thus, a potential difference is applied between 2 "terminals" situated in the same plane and electrically insulated two by two.

E2 is mostly planar (parallel to the first and second electrodes).

It is sought while preserving the electrical conductivity, that the strips are as narrow as possible for improving the "polarizer" power in the ON mode. It is also sought to reduce as much as possible the interstrip width (in other words insulating strips without an electrical conductor) in order to reduce the potential difference to be applied.

For example, the electroconductive strips and/or the interstrip width (insulating strips) are at most 50 µm or 30 µm or 10 µm.

For example, the insulating strips form a serpentine arrangement and a first zone of the electroconductive layer is isolated with a second zone of the layer by a first portion of the first insulating strip of the coil and by a last portion of the last insulating strip of the coil.

It is possible to provide this arrangement of insulating strips by removing an electrically conductive layer, in particular by laser beam. The strip thickness limit is given by the size of the laser beam. The limit of the interstrip distance is dictated by the movement of the laser beam.

Advantageously, the electric field E2 is alternating and preferably the applied voltage U2 between the first and second electrodes is at most 120 V.

E2 is preferably alternating with a frequency from 50 Hz, for example a frequency of 100 Hz, 1 kHz or 2 kHz. Voltage is intended to mean the peak voltage (Vpeak).

The choice of U2 can be controlled, in particular adjusted based on data collected by sensors (temperature, brightness, etc.) in communication with the device (controlling the power supply source).

Preferably, the variable polarizer, in a functional state which is the off state, is able to deliver as output (in particular on the first and second electrodes side) light with a polarization P1 (dominant) and a second polarization P2 (preferably dominant) in the on state (the second functional state detailed below) which is normal to P1.

More broadly, the variable polarizer can have first and second functional states such that:
- in the first functional state which is the off state (no electric voltage), from incident light (in particular on the side opposite to the first and second electrodes) the variable polarizer is able to deliver a (polarized) output light (in particular on the first and second electrodes side) with a first component of the (polarized) electric field P1 along a first axis and a second component of the (polarized) electric field P2 along a second axis normal to the first axis, with a first polarization ratio defined by:

$$rp1 = \frac{T1}{T1 + T2} \quad \text{[Math 1]}$$

rp1 being at least 70% and better still at least 90%, and even at least 95% T1 being the total transmission at a wavelength between 380 and 800 nm along the first axis, or even the total transmission averaged at least between 400 and 600 nm and even from 380 to 640 nm and T2 being the total transmission along the second axis at the wavelength between 380 and 800 nm, or even the total transmission averaged at least between 400 and 600 nm and even from 380 to 640 nm (for a first zero voltage between the first and second electrodes), and in the second functional state which is an on state (with electric power supplied):
from an unpolarized incident light (in particular on the side opposite to the first and second electrodes), the variable polarizer being able to deliver an output light (in particular on the first and second electrodes side) with a second polarization ratio defined by:

$$rp2 = \frac{T'2}{T'1 + T'2} \quad \text{[Math 2]}$$

rp2 is at least 30%, and even at least 50% or 60%

T'1 being the total transmission at a wavelength between 380 and 800 nm along the first axis, or even the total transmission averaged at least between 400 and 600 nm and even from 380 to 640 nm and T'2 being the total transmission along the second axis at the wavelength between 380 and 800 nm, or even the total transmission averaged at least between 400 and 600 nm and even from 380 to 640 nm (for a first zero voltage between the first and second electrodes), Naturally, the variable polarizer then has a multitude of functional states in the on state. There is in particular a threshold voltage from which the anchoring force of the liquid crystals is overcome for a part of the liquid crystals and the more the voltage is increased, the more the liquid crystals reorient up to a saturation voltage which is preferably at most 80 V.

It is then possible to have a polarization ratio which varies according to the voltage U2 applied.

The dielectric anisotropy of the electroactive layer is nonzero and may be negative or positive.

In one advantageous configuration, the variable polarizer comprises:
a unidirectional planar anchoring layer in a direction r1 on (in contact with) a main face of the electroactive layer and on (in contact with) the first and second electrodes, in particular P1 is normal to r1 and P2 parallel to r1
and another unidirectional planar anchoring layer in a direction r2 preferably separate from r1 on (in contact with) another main face of the electroactive layer.

In particular, r1 forms an angle of 90°±15° and better still of 90°±5° with r2 (the nematic liquid crystals then having a strong twist in the off state):
r0 forms an angle of at most 15° and even at most 5° with r1 and the liquid crystals have positive dielectric anisotropy
or r0 forms an angle of 90°±15° and better still of 90°±5° with r1 and the liquid crystals have negative dielectric anisotropy.

The optical system may comprise a static polarizer facing said variable polarizer, which static polarizer is defined by a polarization axis notably arranged to absorb P1 (polarizer axis normal to P1) or arranged to absorb P2 (polarizer axis normal to P2).

As static polarizer, mention may be made of a plastic film with dichroic dyes stretched in a direction forming a polarization axis (which is orthogonal to the light absorption direction). In particular, the static polarizer may be designed to block a given polarization.

Several cases are possible:
the light at the output of the variable polarizer is along P1 (off state) and the polarizer substantially blocks P1 so that the off-state optical system is occulting/darkening.
the light at the output of the variable polarizer is overall along P2 (on state) and the polarizer substantially blocks P1 so that the optical system in the on state remains along P2 and is not occulting.
the light at the output of the variable polarizer is along P1 (off state) and the polarizer substantially blocks P2 so that the optical system in the off state remains along P1 and is not occulting.
the light at the output of the variable polarizer is overall along P2 (on state) and the polarizer substantially blocks P2 so that the on-state optical system is occulting/darkening.

The static polarizer, preferably of similar shape to the variable polarizer, can extend over all or part of the variable polarizer depending on requirements.

The optical system may be without an optical element capable of depolarizing the light between the variable polarizer and the static polarizer.

The optical system may be of any size since the polarizers can be made easily on surfaces of a length of at least 1 m.

Between polarizers, it may be desirable to avoid placing a diffuser.

Of course, any opaque element, occulting or reflecting between the variable and static polarizers can be avoided.

If a device in particular an electrically switchable device is added, in particular a characteristic direction b (a unidirectional anchoring layer along b of a PSLC liquid crystal device with focal conic domain), it is possible to choose to pass (for the off state of the device):
a) from the unmasked off-state to the masked on-state (with increasingly effective masking as a function of U2) if P1 perpendicular to b
b) or from the masked off-state to the unmasked on-state (with masking decreasingly effective as a function of U2) if P1 parallel to b.

The device, in particular polarization-sensitive and electroswitchable, preferably of similar shape to the variable polarizer, may extend over all or part of the variable polarizer depending on requirements.

The optical system may be without an optical element capable of depolarizing the light between the variable polarizer and this polarization-sensitive device.

The optical system may be of any size since these devices can be made easily on surfaces of a length of at least 1 m.

Between the variable polarizer and this polarization-sensitive device, it may be desirable to avoid placing a diffuser.

Of course, it is possible to avoid any opaque element, occulting or reflecting between the variable polarizer and this polarization-sensitive device.

In one embodiment, the variable polarizer and a static polarizer (preferably a plastic film with dichroic dye) and/or an electrically controllable polarization-sensitive device are disjoint and linked by a transparent bonding layer, in particular an optical glue or a thermoplastic layer, in particular a lamination interlayer, or the variable polarizer comprises an element bearing the first and second electrodes which forms said static polarizer.

The transparent bonding layer may be colorless or tinted.

The transparent bonding layer may have a thickness of at most 0.5 mm or even 0.1 mm.

The optical system can be flat or curved, flexible to adapt to the curvatures, for example, of a (monolithic or laminated) glazing. It is then curved on the monolithic glazing or, for example, within said laminated glazing.

The optical system according to the invention can comprise, face to face with the variable polarizer, an (electrically controllable) polarization-sensitive device in particular having an optical response depending on the state of polarization of an incident light on said device, in particular a variable-scattering electrically controllable device using nematic liquid crystals preferably comprising focal conic domains, in particular as described in application WO 2020/065038 incorporated by reference.

Defect line domains are preferred since the haze (scattering power) is remarkable. Focal conic domains of smectic (meso) phase are preferred as described in the application WO 2020/065038 incorporated by reference.

Defect domains generally each comprise two defect lines, focal conics, and which go in pairs, in particular an elliptical with different degrees of eccentricities and the other hyperbolic, thus the name "elliptic-hyperbolic focal conic domain" or EHFCD given to them.

Preferably, nematic and the domains are focal conic domains in particular of smectic mesophase (mesophase P'), in particular with two defect lines, preferably one elliptical and the other hyperbolic (EHFCD).

The focal conic domains in particular EHFCD preferably form a linear network parallel to the direction b.

The liquid crystals of this polarization-sensitive device preferably have overall a degree of organization in a given direction b on the surface FA1 or on the surface FA2 (referred to as the planar orientation face). Their director n—or long axis—is overall along this first direction b b is in particular the axis (of brushing) of a unidirectional planar anchoring layer in contact with this planar orientation face (generating interactions between liquid crystals with this solid layer).

Said electrically controllable device having variable scattering by liquid crystals comprises an electroactive layer with the liquid crystals (nematic, preferably comprising focal conic domains), the direction b forming an angle of 0°±15° or 0°±5° with the polarization P1 of the output light in the off state of the variable polarizer (first and second electrodes) or 0°±15° or 0°±5 with r1 which is perpendicular to P1) or 90°±15 or 90°±5 with the polarization P11 (or 90°±15° with r1).

Thus, according to the invention, the combination of said electrically controllable device having polarization-sensitive variable scattering and said variable polarizer makes it possible to have a wide range of available optical properties, in particular a wide range of haze and light transmission.

When incorporated into a building or vehicle glazing, this polarization-sensitive device may either be oriented outward or inwardly Said polarization-sensitive device, preferably of similar shape to the variable polarizer, may extend over all or part of the variable polarizer depending on requirements.

The optical system may be without an optical element capable of depolarizing the light between the polarization-sensitive device and the variable polarizer.

Between the polarization-sensitive device and the variable polarizer, it may be desirable to avoid placing a diffuser.

Of course, it is possible to avoid any opaque element, occulting or reflecting between the polarization-sensitive device and the variable polarizer.

The optical system of the polarization-sensitive device plus the variable polarizer may have a thickness of at most 1 cm or 5 mm or 1 mm.

The polarization-sensitive device may have a thickness of at most 5 mm or 1 mm or 0.5 mm.

The parameters influencing the optical properties of the polarization-sensitive device are in particular:
  selecting liquid crystals in particular from the mixture of mesogens (in particular for the working temperature range and the voltage level U1 for "de-anchoring" in the on state) and their dielectric anisotropy
  the electroactive layer thickness
  the choice of the anchoring layers In particular, the haze value without an electric field applied (or for a given voltage) can vary based on the size or the type of two-dimensional defects, on their density, on the thickness of the electroactive material, on the choice of the liquid crystals, on the polymer network (degree of crosslinking, polymerization condition), on the monomer, and on the difference in the refraction indices of the polymer and liquid crystals.

In particular, the haze value without applied electric field (or for a given voltage) will vary based on the orientation of the liquid crystals in particular based on the angle between the long (molecular) axis of the first liquid crystals and on the polarization axis of a light polarized along the plane parallel to the surface of the first electroactive layer.

The haze H is preferably defined as the ratio between the integrated light transmission associated with the diffuse transmission DT and LT.

Advantageously, the electric field E1 of the polarization-sensitive device is alternating and preferably the applied electrical voltage U1 is at most 120 V. Preferably, the electrodes are in separate planes, and the liquid crystals have positive dielectric anisotropy (independent of the frequency of the electric field E1).

E2 and/or E1 is preferably alternating with a frequency from 50 Hz, for example a frequency of 100 Hz, 1 kHz or 2 kHz. Voltage is intended to mean the peak voltage (Vpeak).

The electrically controllable device having variable scattering has an optical response dependent on the polarization of the incident light. This differentiated response to the polarization of light is induced by:
  the form factor, the internal structure of two-dimensional topological defects, in particular defect lines, in particular of the defect lines of non-toric focal conic domains, (non-"TFCD"s), smectic mesophases, and/or the arrangement of the different domains (in particular the focal conic domains of smectic mesophases including "TFCD"s) in particular their shape, their orientation, their degree of symmetry, distributed for example randomly, irregularly, etc., a distribution dictated by the anchoring conditions (2D anchoring layer adjustable for example multidirectional anchoring).

An example of various architectures of the polarization-sensitive smectic focal conic domains (in other words the focal conic domain) is given in the publication entitled "Smectic Layer Origami Preprogrammed Photoalignement" by Ling Ma et al, Advances Materials 2017 1606671 pages 1 to 7.

In a preferred embodiment, the variable polarizer, in a first functional state which is the off state, is able to deliver light with a polarization P1, the polarization-sensitive device comprises a directional anchoring layer in a first direction b on the surface, the variable polarizer is arranged such that P1 forms an angle with b of 0°±20° or better of 0°±5° (in particular r2 forming an angle with b of 0°±20° or better still of 0°±5°).

In one embodiment, the variable polarizer, in a first functional state which is the off state, is able to deliver light with a polarization P1, the polarization-sensitive device comprises a directional anchoring layer in a first direction b on the surface, the variable polarizer is arranged such that P1 forms an angle with b of 90°±20° or better of ±5° (in particular r1 forming an angle with b of 90°±20° or better still of ±5°).

As a unidirectional planar anchoring, use may be made of a film of fluoropolymer, such as polytetrafluoroethylene, PTFE, or teflon (with the polymer chains aligned in the direction of displacement of the teflon bar during deposition).

The unidirectional planar anchoring fixes the zenithal and azimuthal orientation of the liquid crystal director n), for example by texturization, brushing (also called rubbing) the planar anchoring layer, for example comprising nanogrooves or microgrooves.

Use may be made of a velvet fabric for the brushing.

For a normal anchoring, the most commonly used layers are based on octyltrichlorosilane (OTS) and N, N-dimethyl-N-octadecyl-3-aminopropyltrimethoxysilane chloride (DMOAP) or polyimides as well.

A layer based on sodium dodecyl sulfate (SDS) or even mixtures of alkanethiols may also generate normal anchoring.

One or more anchoring layers are for example deposited by the liquid route.

One anchoring layer is for example:
  preferably dielectric (in particular amorphous, polymeric and/or mineral, a glass) with a functionalization of the surface; in particular, a layer based on polyimide polyvinyl alcohol (PVA), for example for a planar anchoring.

The dichroic dye may be an anisotropic organic molecule which has optical anisotropy, is elongated, in particular rod-shaped. It is dissolved in the material, in particular dissolved in the liquid crystals. The % of (each) dichroic dye is adjusted so as not to exceed the solubility limit. In particular, one (or more) dichroic dye(s) is (are) chosen which is (are) chemically compatible with the liquid crystals.

In particular, the (each) (elongated, rod-shaped) dichroic dye may have a long molecular axis and the absorption varies along the long axis or the short axis.

The dichroic dyes are controlled by the orientation of the liquid crystals of the electroactive layer, the movement (the rotation) of the liquid crystals under the effect of the electric field (E2) at play, tending to be aligned with the electric field, leading to the movement (the rotation) of the dichroic dyes, the long axis also tending to be aligned with the electric field.

The absorption of a dichroic dye thus varies based on the orientation thereof relative to the polarization of the incident light. On the contrary, a non-dichroic dye, which does not exhibit absorption anisotropy, is insensitive, or not very sensitive, to the electric field and will even not change the absorption. Such dyes may be added to adjust the desired hue.

There are several families of dichroic dyes, in particular those described in the publication by Mark T Sims entitled "dyes as guests in ordered systems: current understanding and future directions" Liquid Crystals, 2016, Vol 43, NOS. 13-15, page 2363-2374.

The dichroic dyes according to the invention may be azo dyes, with AZO (—N=N), in particular rod-shaped. It is possible to induce chemical changes to the azo dyes, for example with ester groups incorporated (cf. p. 2366 of the above-mentioned publication).

Other dyes are anthraquinones, which are generally fused rings, or rod-shaped by adding substituents. Examples of dichroic dyes (chromophores) are in table 1 of this above-mentioned publication).

Examples of dichroic dyes which are suitable for the invention are additionally mentioned in the book entitled "Electrooptic effect in Liquid Crystal Materials" by L. M Blinov et al., published by Springer in 1994, in particular in chapter 2.3 entitled "Optical Anisotropy and Dichroism" and pages 66 to 68, including table 2.2.

For example, for a blue dye, it is possible to choose, as maximum absorption wavelength, 630 nm±10 nm and, as wavelength outside the absorption band, 430 nm±50 nm or ±10 nm. Mention may be made, for example, of the dye M412 sold by Mitsui Chemicals.

For example, for a red dye, it is possible to choose, as maximum absorption wavelength, 500 nm±10 nm and, as wavelength outside the absorption band, 650 nm±50 nm or ±10 nm. Mention may be made, for example, of the dye SI-426 sold by Mitsui Chemicals.

For example, for a yellow dye, it is possible to choose, as maximum absorption wavelength, 400 nm±10 nm and, as wavelength outside the absorption band, 600 nm±50 nm or ±10 nm. Mention may be made, for example, of the dye SI-486 sold by Mitsui Chemicals.

For example, for a black dye, mention may be made of the dye SI-428 sold by Mitsui Chemicals. The variable polarizer may comprise:

- a first transparent dielectric element, bearing the first and second electrodes made of strips (coplanar configuration) and even of the anchoring layer, preferably unidirectional according to r1, the first element being chosen from a glass sheet or a transparent polymeric sheet distinct from or corresponding to said dielectric support
- a second transparent dielectric element, bearing at least one anchoring layer, preferably one-way, according to r2, the second element being chosen from a glass sheet or a transparent polymeric sheet (with an optional external scratch-resistant layer)

The optical system can be flat or curved, flexible to adapt to the curvatures, for example, of a (monolithic or laminated) glazing. It is then curved on the monolithic glazing or, for example, within said laminated glazing.

The invention also relates to an optionally curved laminated glazing comprising:
- a first additional sheet of glass, in particular of thickness from 0.7 mm to 4 mm
- a thermoplastic, in particular EVA or PVB, lamination interlayer
- a second additional sheet of glass, in particular of thickness from 0.7 mm to 4 mm or even of less than 0.7 mm, or else a sheet of plastic such as a polycarbonate or a PMMA (in particular with a PU lamination interlayer), the main inner faces referred to as F2 and F3 of the first and second additional glass sheets being opposite the optical system as described previously being preferably between the faces F2 and F3 and preferably in the lamination interlayer; preferably the first element bearing the first and second electrodes being polymeric and even the second element (on the anchoring layer side with r2) being polymeric.

Preferably, the thermoplastic lamination interlayer surrounds the edge of the optical system (variable polarizer, etc.).

The edge face of the optical system may be set back relative to the outermost edge face of the lamination interlayer (or of the first sheet).

Preferably, the optional layer-bearing sheets (substrate, support, first and second elements) are preferably of a thickness of at most 0.7 mm and even of at most 0.3 or 0.2 mm. For the glass sheets, it is possible to choose thin glass (less than 1 mm) and even ultrathin glass (UTG).

One of the additional glass sheets may be tinted and the other may be clear or extra-clear. The thermoplastic lamination interlayer may be colorless (clear, extra-clear) or tinted.

For said bearing elements or else for an additional glass sheet or a glazing of a laminated and/or multiple glazing, it is possible to choose a clear or extra-clear glass. A clear glass typically contains a content by weight of iron oxide of the order of 0.05 to 0.2%, while an extra-clear glass generally contains approximately 0.005 to 0.03% of iron oxide.

The additional glass sheet or a glazing of a laminated and/or multiple glazing may nonetheless be tinted, for example blue, green, gray or bronze.

A tinted additional glass sheet or a tinted glazing of a laminated and/or multiple glazing, may preferably have a light transmission $T_L$ of less than or equal to 10%.

The glass is preferably of soda-lime-silica type but it can also be a glass of borosilicate or alumino-borosilicate type. The thickness of the glass is generally within a range extending from 0.5 mm to 19 mm, preferably from 0.7 to 9 mm, in particular from 2 to 8 mm, or even from 4 to 6 mm.

The thermoplastic lamination interlayer provides a connection to a rigid or flexible element. This polymeric lamination interlayer may in particular be a layer based on polyvinyl butyral (PVB), ethylene vinyl acetate (EVA), polyethylene (PE), polyvinyl chloride (PVC), thermoplastic urethane, polyurethane (PU), ionomer, polyolefin-based adhesive, thermoplastic silicone or multi-component or single-component, thermally crosslinkable (epoxy, PU), or UV-crosslinkable (epoxy, acrylic resin) resin.

The PVB interlayer can be wedge-shaped, thus with a cross section which decreases in wedge shape from the top toward the bottom of the laminated glazing in order to avoid a double image in the case of a head-up display (HUD), very particularly for a windscreen. The PVB interlayer is optionally acoustic and/or tinted. The acoustic PVB interlayer can comprise at least one "central" layer made of viscoelastic plastic with vibro-acoustic damping properties, in particular based on polyvinyl butyral (PVB) and plasticizer, and further comprising two external layers made of standard PVB, the central layer being between the two external layers.

Optionally, one or both external layers has a cross section which decreases in wedge shape from the top toward the bottom of the laminated glazing, the layer made of viscoelastic plastic with vibro-acoustic damping properties having an unvarying cross section from the top toward the bottom of the laminated glazing. Mention may be made, as an example of an acoustic sheet, of the patent EP 0 844 075.

The first and/or second glazing of the laminated glazing may (depending on the esthetic rendering or the desired optical effect) be a clear glass (light transmission $T_L$ higher than or equal to 90% for a thickness of 4 mm), for example a glass of standard soda-lime composition such as Planilux® from Saint-Gobain Glass, or an extra-clear glass ($T_L$ higher than or equal to 91.5% for a thickness of 4 mm), for example a soda-lime-silica glass with less than 0.05% Fe III or $Fe_2O_3$ such as the glass Diamant® from Saint-Gobain Glass, or the glass Optiwhite® from Pilkington or the glass B270® from Schott, or a glass of another composition described in document WO04/025334. The Planiclear® glass from the Saint-Gobain Glass company can also be chosen.

The glass of the first and/or second glazing can be neutral (without coloration) or (slightly) tinted, in particular gray or green, such as the TSA glass from Saint-Gobain Glass. The glass of the first and/or second glazing may have undergone a chemical or heat treatment of the hardening or annealing type or a tempering (in particular in order to obtain a better mechanical strength) or be semitempered.

The light transmission $T_L$ can be measured according to the standard ISO 9050:2003 using illuminant D65 and is the total transmission (in particular integrated over the visible region and weighted by the curve of sensitivity of the human eye), taking into account both direct transmission and possible diffuse transmission, the measurement being carried out, for example, using a spectrophotometer equipped with an integrating sphere, the measurement at a given thickness subsequently being converted, if appropriate, to the reference thickness of 4 mm according to the standard ISO 9050:2003.

The optical system according to the invention may be integrated into a glazing, in particular a monolithic (flat and/or curved) one, and the optical system forms a strip, in particular a peripheral strip, over a portion of a main face of the glazing.

It is possible to use the optical system according to the invention as defined above in a vehicle or building.

It may be used in particular as:
internal partition (between two rooms or in one space) in a building, in a road, rail, marine or airborne vehicle (between two compartments, in a taxi, bus, train, etc.), in particular as a glazed shower or bathtub wall,
glass door (entrance door or service door), window (single, double, triple glazing), ceiling, tiling (floor or ceiling), toilet door, a glazed part of home or street furniture
glazing for a motor vehicle (car, truck, bus, coach, etc.) which is therefore a road, rail, marine (boat) vehicle, windscreen, side glazing, roof, etc.
projection or backprojection screen,
store window, window in particular for a booth.

Of course, it may form all or part of a glazing (a partition and window of transom type, etc.).

A building glazing can therefore be bearing the optical system as described previously, in particular a monolithic, double or triple glazing (with or without laminated glazing) partition, window, etc.

A vehicle glazing unit, in particular for a road vehicle, can therefore carry the optical system as described previously, in particular windshield (the optical system forming one or more peripheral band(s)), sunroof, (monolithic or laminated) side glazing, in particular a quarter-glass.

The laminated glazing according to the invention, in particular for a private car (windscreen etc.) or truck, can be curved (bent) in one or more directions particularly for the first sheet, the second sheet and a radius of curvature of 10 cm to 40 cm. It can be flat for buses, trains, tractors.

The optical system according to the invention may be integrated within a laminated and in particular curved glazing, is between the first and second glazings, respectively called exterior and interior glazings, and forms a peripheral strip over an upper portion of the glazing, the edge face referred to as external of the stack being masked from the outside by a first opaque peripheral layer, in particular an enamel over the external glazing (preferably on face F2), and/or the edge face referred to as internal of the stack being masked from the inside by an opaque peripheral layer, in particular an enamel over the internal glazing (on face F4 for example, or even face F3).

The curved laminated glazing according to the invention, in particular windscreen or side glazing, can have a $T_L$-in the clear glass pane-which is preferably at least 70% and even at least 75% or even at least 80%.

The curved laminated glazing according to the invention, in particular sunroof, can have a light transmission $T_L$ of at most 10% and even of 1% to 6%.

For a motor vehicle roof, at least one, or all, of the following criteria are preferred:
an energy transmission $T_E$ of at most 10% and even of 4 to 6%,
an energy reflection RE (preferably face F1 side) of at most 10%, better still of 4 to 5%,
and a total transmission of the solar energy TTS<30% and even <26%, even from 20 to 23%.

The bending of the first and second glazings (in particular windshield) can be in one or more directions, for example described in the document WO2010136702.

In order to limit heating in the passenger compartment or to limit the use of air conditioning, one of the glazings at least (preferably the exterior glass) is tinted, and the laminated glazing can also comprise a layer which reflects or absorbs solar radiation, preferably on face F4 or on face F2 or F3, in particular a transparent electrically conductive oxide layer, known as a "TCO layer", (on face F4) or even a stack of thin layers comprising at least one TCO layer, or stacks of thin layers comprising at least one silver layer (on F2 or F3), the or each silver layer being positioned between dielectric layers.

The optical system according to the invention may be used in combination with other electrically controllable devices such as those with electroluminescent systems (set of inorganic point-source LEDs, organic diodes or OLED, TFEL (thin film). Both may be facing or adjacent within a laminated glazing (of the lamination interlayer.

The optical system according to the invention can be used in particular in a laminated glazing, in combination with another electrically controllable device such as an electroluminescent electrically controllable device, in particular, LED, OLED, TFEL. Other details and features of the invention will become apparent from the detailed description which follows, made with reference to the following appended drawings and in which:

FIG. 4 shows a schematic cross-sectional view of an optical system 1001 composed of an electrically controllable variable polarizer using liquid crystals and dichroic dye 100 associated with a polarization-sensitive electrically controllable device 20 in a third embodiment of the invention.

FIG. 5 is a schematic partial view in perspective of the variable polarizer of FIG. 1 in a first functional state which is the off state.

FIG. 6 is a schematic partial view in perspective of the variable polarizer of FIG. 1 in a second state which is an on state at a given voltage U2.

Figure 14:
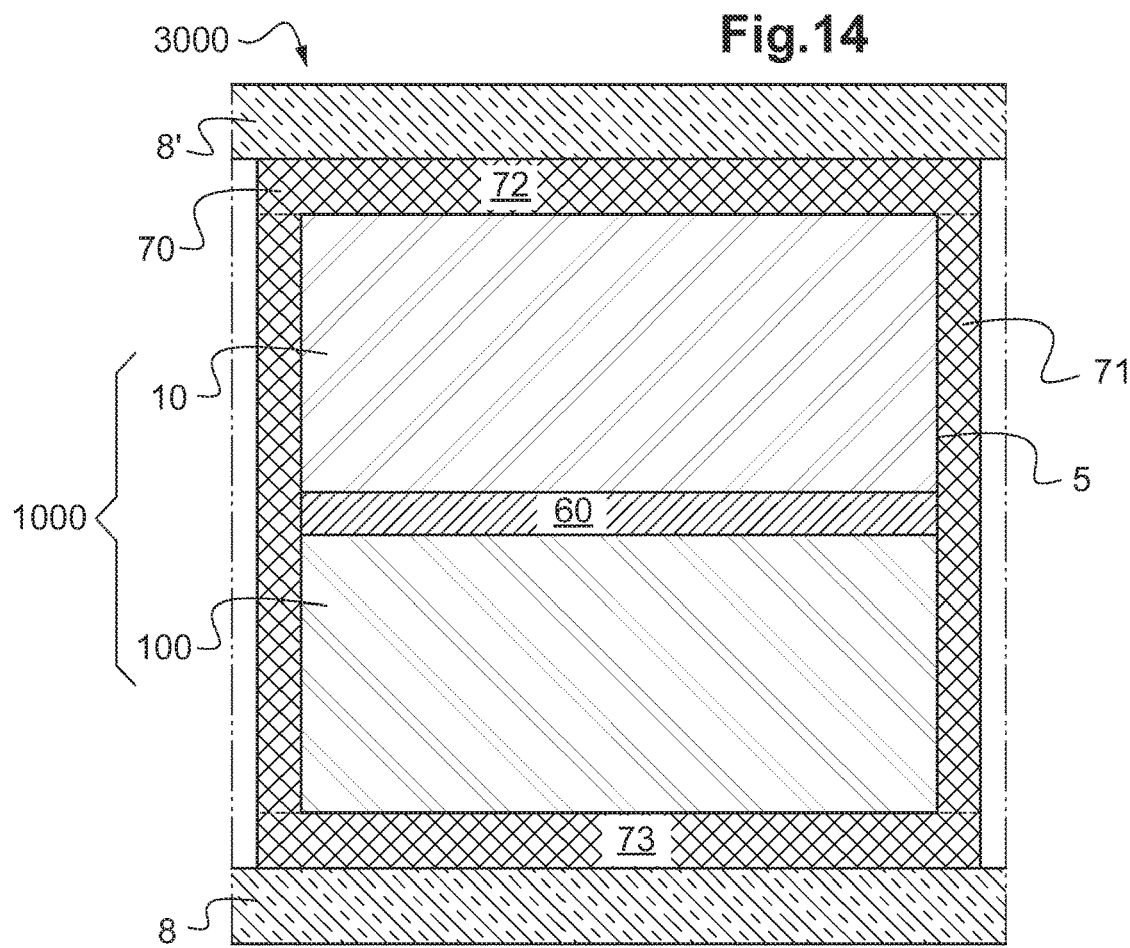
FIG. 14 shows a schematic sectional view of a laminated glazing bearing an optical system 3000 according to the invention.
Figure 15:
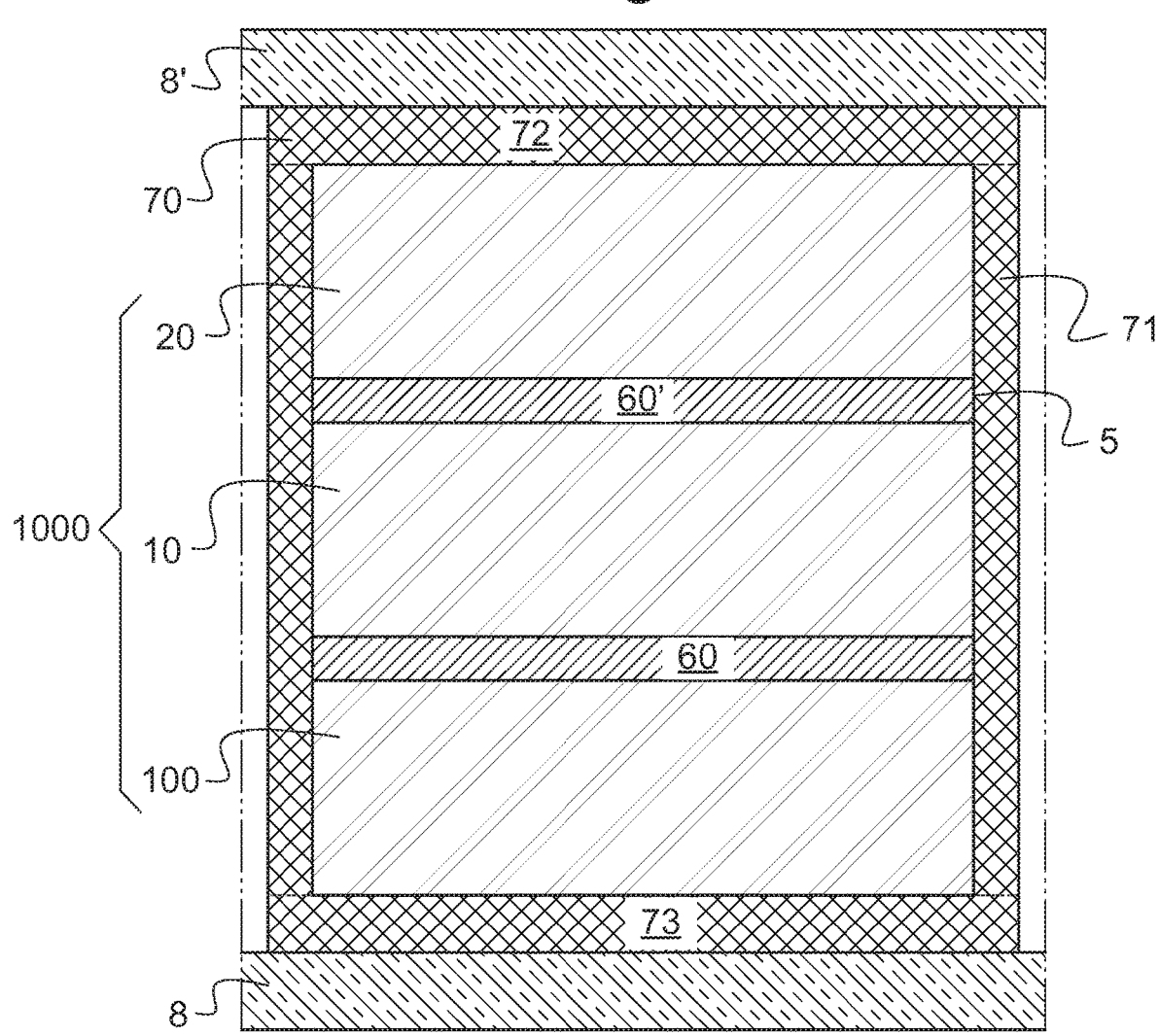

FIG. 15 shows a schematic sectional view of a laminated glazing bearing an optical system 3000 according to the invention in a variant of FIG. 14, adding a polarization-sensitive electrically controllable device 20 in addition to variable polarizer 100 and static polarizer 10.

FIGS. 16 and 17 show, respectively, a front view and a schematic sectional view of a laminated glazing bearing an optical system 4000 according to the invention.

The elements shown in the figures are not to scale.

Figure 1:
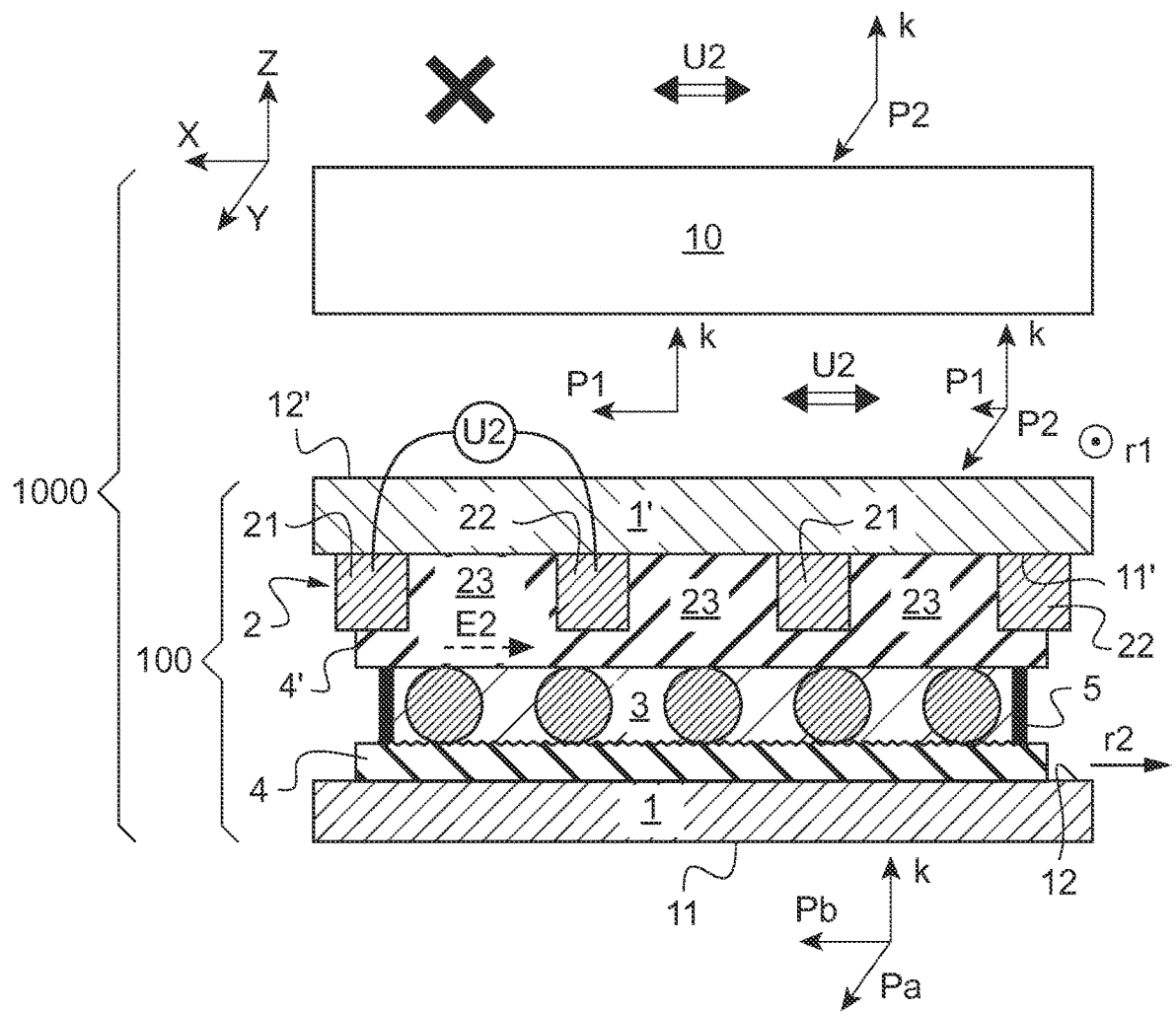
FIG. 1 shows a schematic cross-sectional view of an optical system 1000 comprising an electrically controllable variable polarizer using liquid crystals and dichroic dye 100 associated with a static polarizer 10 in a first embodiment of the invention.

FIG. 1 shows a schematic cross-sectional view of an optical system 1000 comprising an electrically controllable variable polarizer using liquid crystals and dichroic dye 100 associated with a static polarizer 10 (stretched plastic film with dichoric dye) in a first embodiment of the invention.

Figure 2:
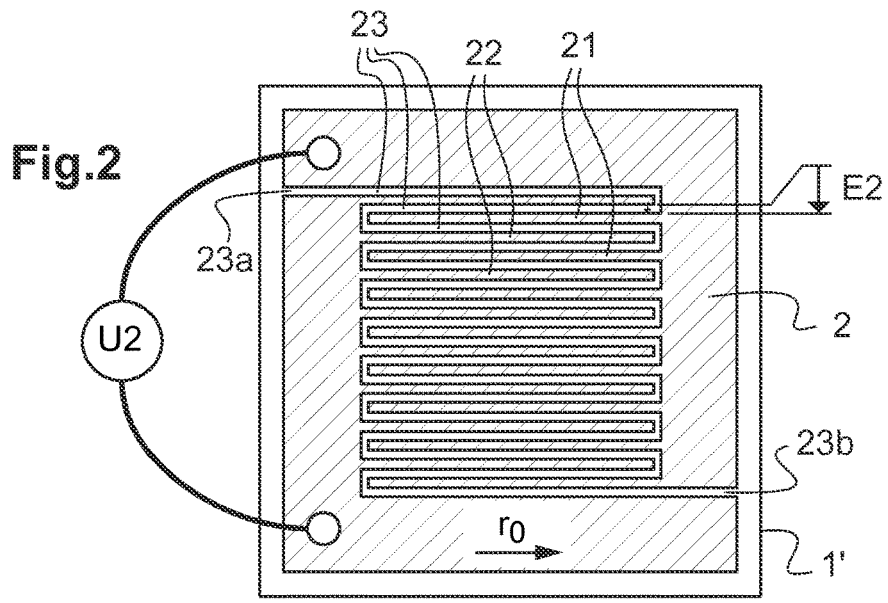
FIG. 2 is a front view of electrodes in strips and powered two by two used in the variable polarizer of FIG. 1.

FIG. 2 is a front view of electrodes in strips and powered two by two used in the variable polarizer 100 of FIG. 1.

An orthonormal coordinate system X, Y and Z is defined.

The electrically controllable polarizer 100 is here characterized by a first direction r1 for anchoring a surface of the liquid crystals (in the off state) on the output (on the side of its coplanar electrodes 21, 22) and even by a second direction r2 of anchoring a surface of the liquid crystals on the side opposite the output.

The variable polarizer 100 has first and second functional states and:

in the first functional state which is the off state here, from an unpolarized incident light (on the side of its coplanar electrodes, 21, 22) (represented schematically by normal components Pa and Pb of the same intensity, with k the propagation vector of the light along Z), the variable polarizer is able to deliver a polarized output light with a first component of the polarized electric field P1 along an axis X (normal to r1) and a second component of the polarized electric field P2 along an axis Y normal to Y, with a first polarization ratio defined by $$rp1 = \frac{T1}{T1 + T2} \quad \text{[Math 3]}$$

rp1 is preferably at least 70% or 90%, and even at least 95% T1 being the total transmission at a wavelength between 380 and 800 nm according to X and T2 being the total transmission along Y at the wavelength between 380 and 800 nm (P1 is therefore ultra dominant with respect to P2)

and in the second functional state which is an on state at voltage U2 (between electrodes in coplanar strips, two-by-two):

from the non-polarized incident light, the variable polarizer being able to deliver a polarized output light with a second polarization ratio defined by $$rp2 = \frac{T'2}{T'1 + T'2} \quad \text{[Math 4]}$$

rp2 being at least 30%, and even at least 50% or 60% T'1 being the total transmission at a wavelength between 380 and 800 nm along the first axis and T'2 being the total transmission along the second axis at the wavelength between 380 and 800 nm for a voltage U2b between the third and fourth electrodes P2 is preferably predominant relative to P1.

The polarization of the output light of the variable polarizer may be elliptical Naturally, the variable polarizer then has a multitude of functional states in the on state. There is in particular a threshold voltage from which the anchoring force of the liquid crystals is overcome for a part of the liquid crystals and the more the voltage is increased, the more the liquid crystals reorient up to a saturation voltage which is preferably at most 80 V.

It is then possible to have a polarization ratio $$r(U2) = \frac{T2}{T1+T2}$$

which varies according to the voltage U2 applied.

Optionally, depending on the requirements, a static polarizer 10 is added so that in the off state there is no longer any light (or almost none)—symbolized by the cross in FIG. 1—and in the on state (at U2), there remains a little light along the axis of P2.

More specifically, the variable polarizer 100 comprises a stack of (physical, solid) layers in this order:
 a first transparent dielectric element 1' with main faces 11' and 12' here a glass 1.1 mm thick—or in one variant, plastic such as PET
 first and second transparent electrodes of separate strips 2 comprising first strips 21 and second/first strips 22 between insulating strips 23—indium tin oxide layer of ITO with square resistance 100 ohm/square, more broadly between 5 and 300 ohm/square
 a first unidirectional planar anchoring layer 4' transparent in a direction r1 along Y, on the first transparent dielectric element 1' (face 11') and on the strips 21, 22 in contact with the first anchoring layer 4', a colored dielectric electroactive layer 3 with a main face referred to as face F3 on the side of the other face and a main face referred to as opposite face FA4, herein of thickness Ep1 (less than 20 µm) made of a material comprising
 liquid crystals
 one or more dichroic dyes (in the dissolved state)
 spacers being distributed in the material, herein glass beads
 the layer 3 being sealed at the periphery by a polymeric seal 5 for example made of epoxy acrylate, herein of cyanoacrylate
 a second transparent anchoring layer 4, here unidirectional anchoring in a direction r2 perpendicular to r1, parallel to X
 a second transparent dielectric element 1 (of layer 4) with main faces 11 and 12, here a glass 1.1 mm thick—or in one variant, plastic such as PET For the power supply via an electrical source, conductive tapes (not shown), in particular metal conductive tapes, for example made of copper, are fixed by adhesive bonding along and on the peripheral edges and are in contact with the electrodes 21, 22 (one tape per electrode, the tapes being preferably on opposite edges). These tapes are then connected to a power supply. The edge faces of the electrodes 21, 22 and the edge of the electroactive layer are preferably set back relative to the edges of the rectangular (square) or otherwise shaped elements 1, 1'. The thicknesses of the (glass) elements 1, 1' may for example be 0.7 mm to 4 mm. They may be of a thickness preferably of greater than 100 µm and of at most 300 µm for better mechanical strength of the assembly and/or ease of use and handling, but if more flexibility is desired, it is possible to go down for example to 50 µm.

The production process is described more precisely below.

The first anchoring layer 4' is therefore a layer inducing a unidirectional planar anchoring in a direction r1 of the liquid crystals at the surface (outside the field) in contact with this layer 4.

The first layer anchoring layer 4' is deposited on the ITO strips 21 and 22 and between the strips 23 on the first element 1' by spin-coating a solution of polyvinyl alcohol (PVA; Sigma-Aldrich; molecular weight 27 kDa) approximately 500 nm thick.

The first layer anchoring layer 4' is then rubbed in the direction r1 parallel to the strips extending in a direction r0 // to r1)

The second anchoring layer 4' is therefore a layer inducing a unidirectional planar anchoring in a direction r2 of the second liquid crystals at the surface (outside the field) in contact with this layer 4.

The second anchoring 4 is deposited on the second element 1 by spin-coating a solution of polyvinyl alcohol (PVA; Sigma-Aldrich; molecular weight 27 kDa) approximately 300 nm thick. The second anchoring layer 4 is then rubbed in the direction r2 perpendicular to r1.

The electroactive layer of liquid crystals 3 is composed of nematic liquid crystals (98% by weight) with a black dichroic dye called S428 sold by Mitsui Chemicals (2% by weight). The thickness of the electroactive layer is 10 µm.

As shown in FIG. 2, for example, the insulating strips 23 form a serpentine arrangement and a first zone of the electroconductive layer is isolated with a second zone of the layer by a first portion 23a of the first insulating strip of the coil and by a last portion 23b of the last insulating strip of the coil.

The electrically conductive strips 21 and 22 are parallel to r0 and r1.

It is possible to provide this arrangement of insulating strips by removing an electrically conductive layer, in particular by a femtosecond laser beam, for example with a diameter of 30 µm and the strips being 15 µm. The strip thickness limit is given by the size of the laser beam. The limit of the interstrip distance is dictated by the movement of the laser beam.

The liquid crystals exhibit positive dielectric anisotropy here.

Figure 3:
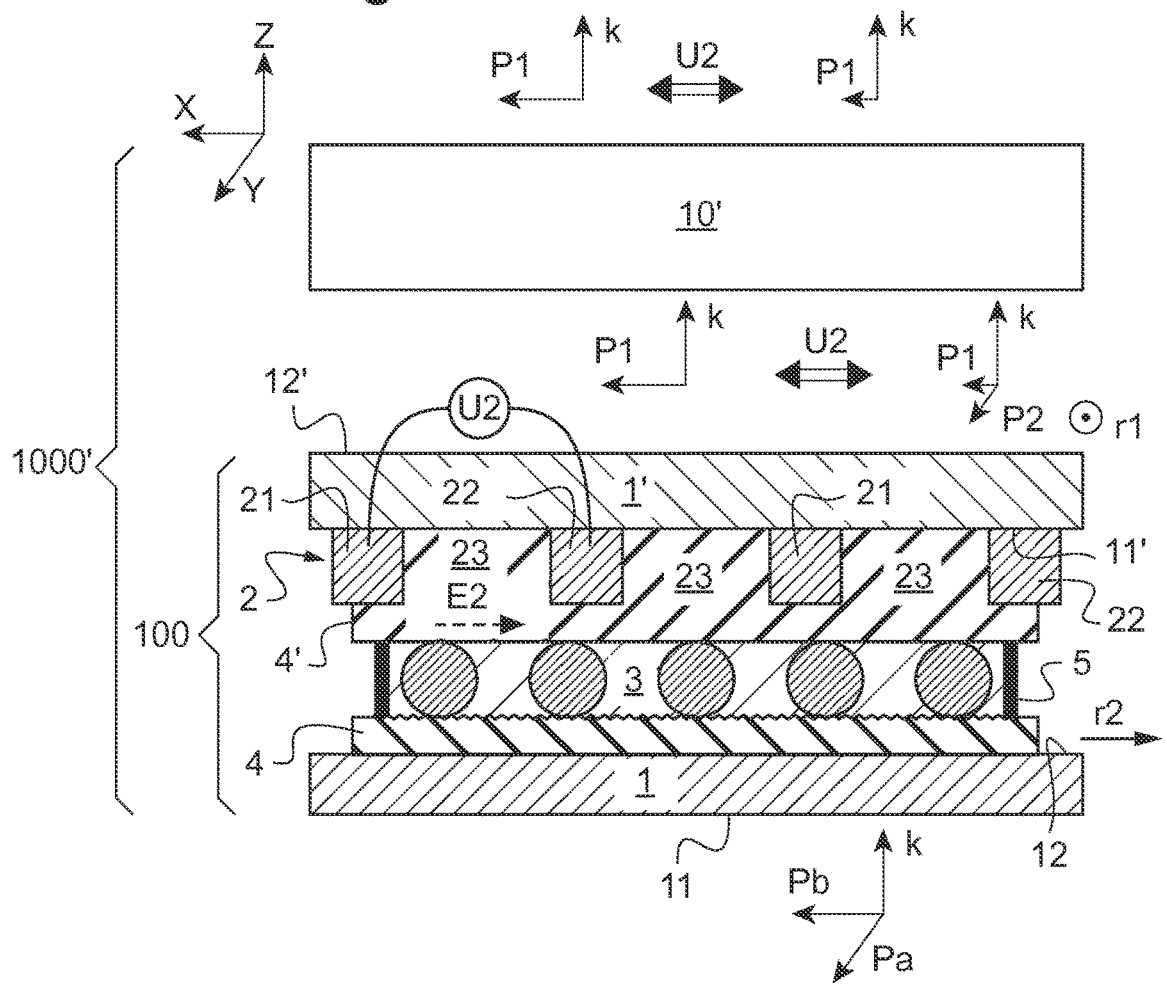
FIG. 3 shows a schematic cross-sectional view of an optical system 1000' composed of an electrically controllable variable polarizer using liquid crystals and dichroic dye 100 associated with a static polarizer 10' in a second embodiment of the invention.

FIG. 3 shows a schematic cross-sectional view of an optical system 1000' composed of an electrically controllable polarizer using liquid crystals and dichroic dye 100 associated with a static polarizer 10' (stretched plastic film with dichroic dye) in a second embodiment of the invention which differs from the first embodiment in that the static polarizer 10' is rotated by 90°, therefore it cuts the polarization along P2.

FIG. 4 shows a schematic cross-sectional view of an optical system 1001 composed of an electrically controllable variable polarizer using liquid crystals and dichroic dye 100 associated with a polarization-sensitive electrically controllable device 20 in a third embodiment of the invention.

The device 100 is similar to that described in FIG. 1.

The device 20 can have a stack of layers similar to the device 10 with the following modifications:
 a directional anchoring layer along b
 a planar anchoring layer
 planar electrodes (on either side of the electroactive layer) and therefore normal electric field (along Z)

nematic liquid crystals with focal conic domains, in particular EFHCD optionally colored electroactive layer, of PSCL type (with crosslinked polymer).

FIG. 5 is a schematic partial view in perspective of the variable polarizer of FIG. 1 in a first functional state which is the off state.

At the surface of the anchoring layer 4, the liquid crystals 312 (defined by the director n2) and dichroic dyes 322 are (generally) parallel to r2.

At the surface of the antagonistic anchoring layer 4', the liquid crystals 310 (defined by the director n1) and dichroic dyes 320 are (generally) parallel to r1.

This antagonism forces the nematic liquid crystals to undergo a torsional deformation and the dichroic dyes are controlled by the nematics.

In the thickness of the electroactive layer 3, the liquid crystals 311 (defined by the director n3) and dichroic dyes 321 form an angle (generally) with r1 and r2.

FIG. 6 is a schematic partial view in perspective of the variable polarizer of FIG. 1 in a second state which is an on state at a given voltage U2.

At the surface of the anchoring layer 4, the liquid crystals 312 (defined by the director n2) and dichroic dyes 322 remain (generally) parallel to r2.

In the thickness of the electroactive layer 3, the liquid crystals 311 (defined by the director n3) and dichroic dyes 321 generally tend to be aligned along r2.

At the output, the polarization P1 perpendicular to r1 decreases and may be quasi-off.

A first polarization ratio has been defined for the polarization P1 (normal to r1) as follows:

$$r1(U2) = \frac{T1}{T1+T2}$$

A second polarization ratio has been defined for the polarization P2 (parallel to r1 and normal to P1) as follows:

$$r2(U2) = \frac{T2}{T1+T2}$$

T1 being the averaged total transmission between 380 and 640 nm along the axis of P1, and T2 being the total transmission along the axis of P2 averaged between 380 and 640 nm. A spectrometer of the PerkinElmer Lambda 900 type was used.

The curves of the ratios r1 and r2 as a function of the voltage U2 applied is indicated in the table 1.

TABLE 1

| U2 (V) | $r_1$ (%) | $r_2$ (%) |
|---|---|---|
| 0 | 99 | 1 |
| 20 | 49 | 51 |
| 40 | 32 | 68 |
| 60 | 26 | 74 |
| 80 | 22 | 78 |

At zero voltage, the polarization along P1 is almost perfect.

As the voltage increases, the component P2 increases.

Figure 7:
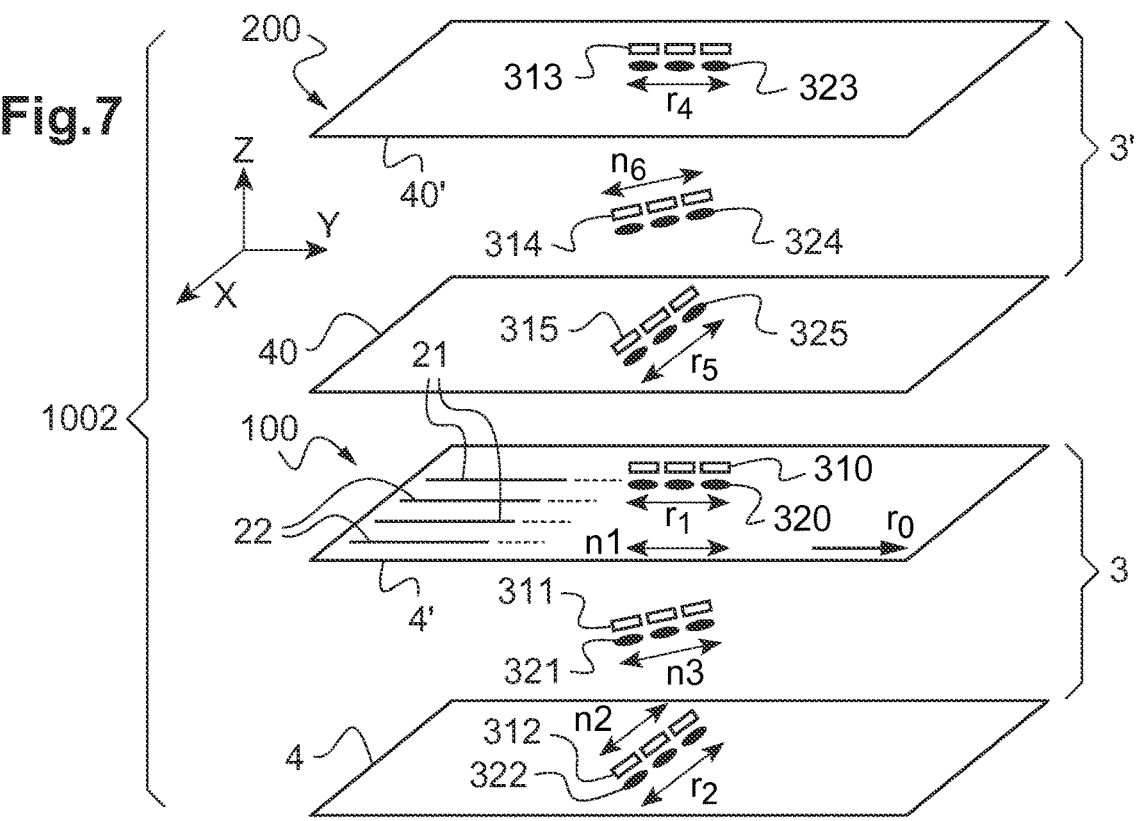
FIG. 7 is a schematic partial view in perspective of a system 1002 comprising the variable polarizer and an alternating static polarizer with a structure similar to the variable polarizer but without electrodes in a first functional state of the variable polarizer which is the off state.

FIG. 7 is a schematic partial view in perspective of a system 1002 comprising the variable polarizer and an alternating static polarizer with a structure similar to the variable polarizer but without electrodes in a first functional state of the variable polarizer which is the off state (as described in FIG. 5).

The alternating static polarizer 3' comprises the same unidirectional anchoring layers 40, 40' according to r4 and r5 reproducing r1 and r2, twisted nematic liquid crystals between the surface 40 (nematic 315 and dye 325), the core of the passive liquid crystal layer 3' (nematic 314 and dye 324) and the surface 40' (nematic 313 and dye 323).

Figure 8:
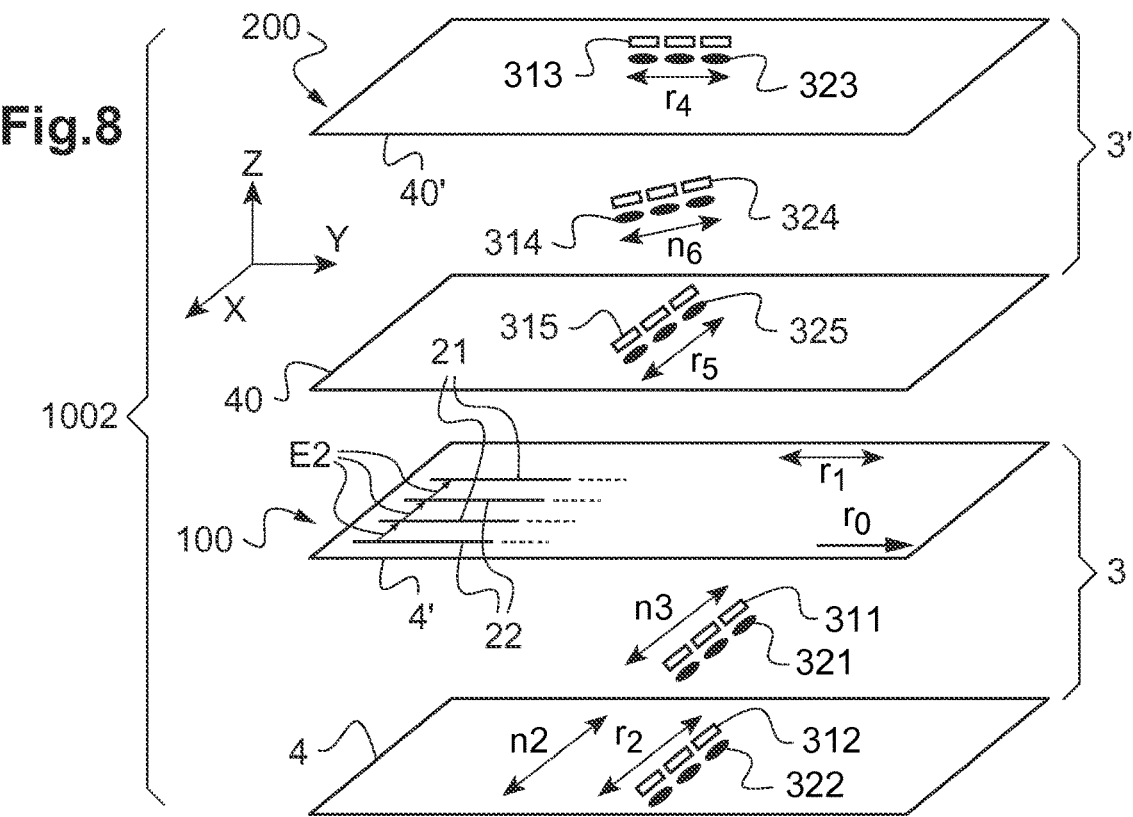
FIG. 8 is a schematic partial view in perspective of the variable polarizer and of the alternating static polarizer of FIG. 7 in a second functional state of the variable polarizer which is the on state.

FIG. 8 is a schematic partial view in perspective of the variable polarizer and of the alternating static polarizer of FIG. 7 in a second functional state of the variable polarizer which is the on state (as described in FIG. 6).

Figure 9:
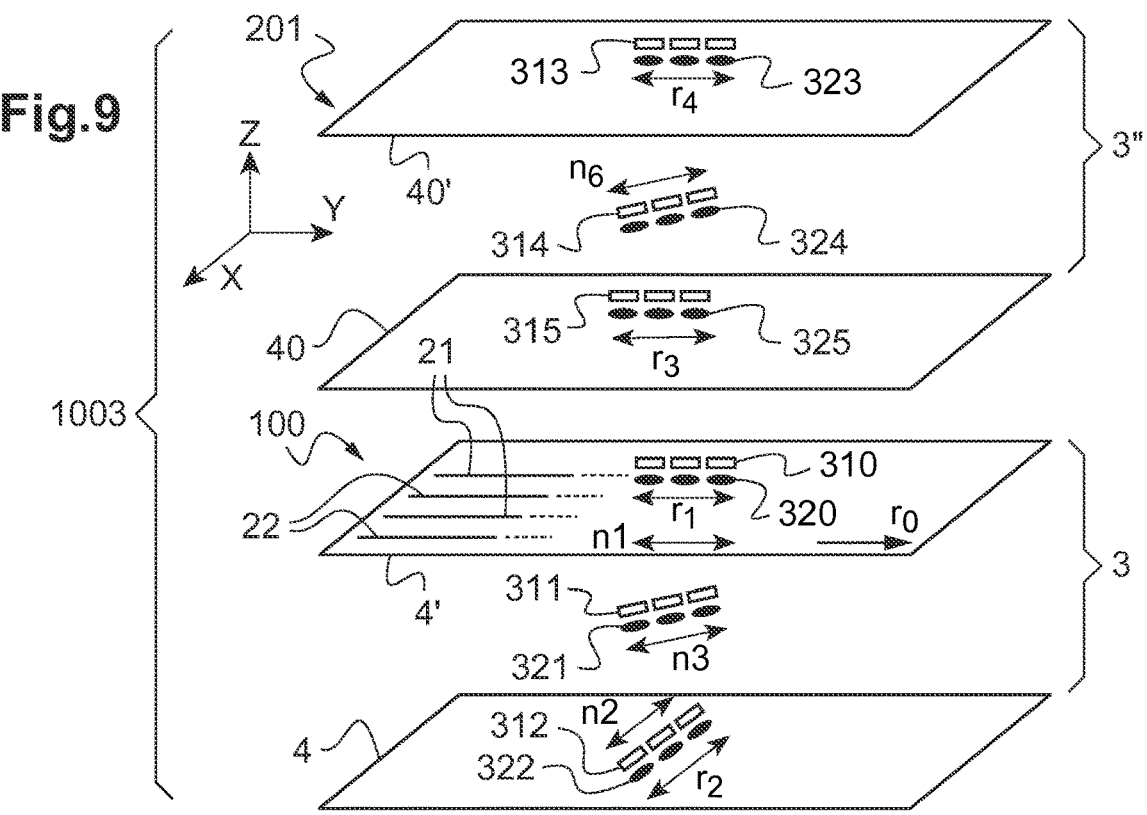
FIG. 9 is a schematic partial view in perspective of the variable polarizer of FIG. 1 comprising the variable polarizer and an alternating static polarizer with a structure similar to the variable polarizer but without electrodes in a first functional state of the variable polarizer which is the off state, in a variant of FIG. 7 with the alternating static polarizer having rotated 90°.

FIG. 9 is a schematic partial view in perspective of a system 1002 comprising the variable polarizer of FIG. 1 and an alternating static polarizer 3' with a structure similar to the variable polarizer but without electrodes in a first functional state of the variable polarizer which is the off state, in a variant of FIG. 7 with the alternating static polarizer 3" having rotated 90°.

Figure 10:
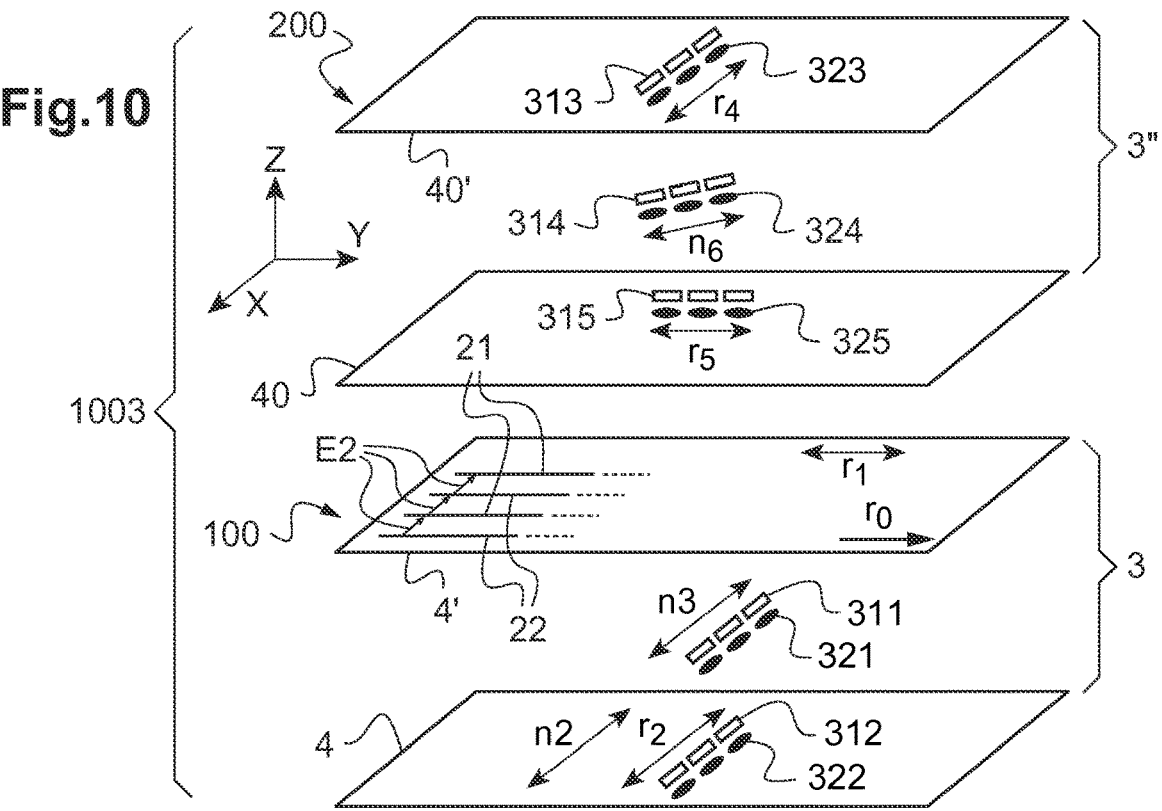
FIG. 10 is a schematic partial view in perspective of the variable polarizer and of the alternating static polarizer of FIG. 9 in a second functional state which is the on state.

FIG. 10 is a schematic partial view in perspective of the variable polarizer and of the alternating static polarizer 3" of FIG. 9 in a second functional state which is the on state.

Figure 11:
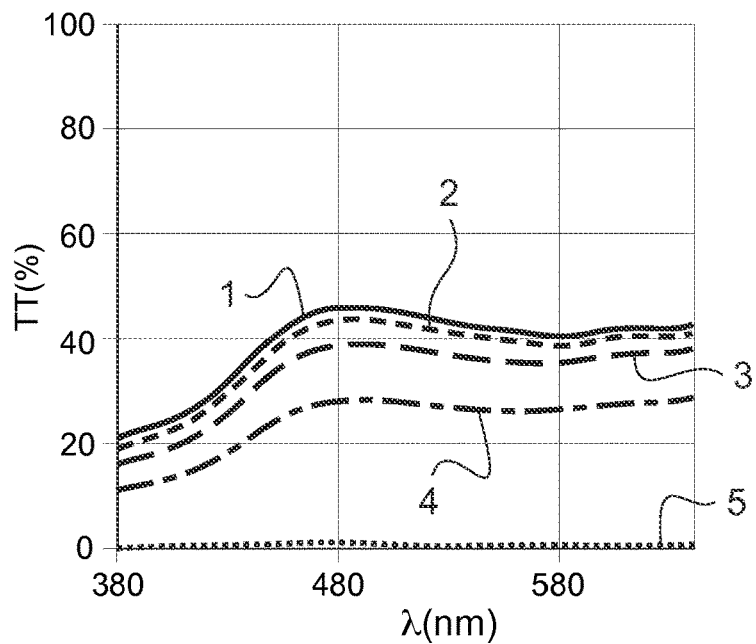
FIG. 11 shows a set of five curves corresponding to the total transmission TT as a function of the wavelength λ between 380 and 630 nm of the variable polarizer illuminated with a polarized light (parallel to) along r2.

FIG. 11 shows a set of five curves corresponding to the total transmission TT as a function of the wavelength λ between 380 and 630 nm of the variable polarizer illuminated with a polarized light (parallel to) along r2.

Curve 1 is the on mode (with a voltage U2 equal to 80 V).
Curve 2 is the on mode (with a voltage U2 equal to 60 V).
Curve 3 is the on mode (with a voltage U2 equal to 40 V).
Curve 4 is the on mode (with a voltage U2 equal to 20 V).
Curve 5 is the off mode (with a voltage U2 equal to 0 V).

The total transmission TT is almost zero in the off state of the variable polarizer.

The total transmission TT increases with the voltage applied.

Figure 12:
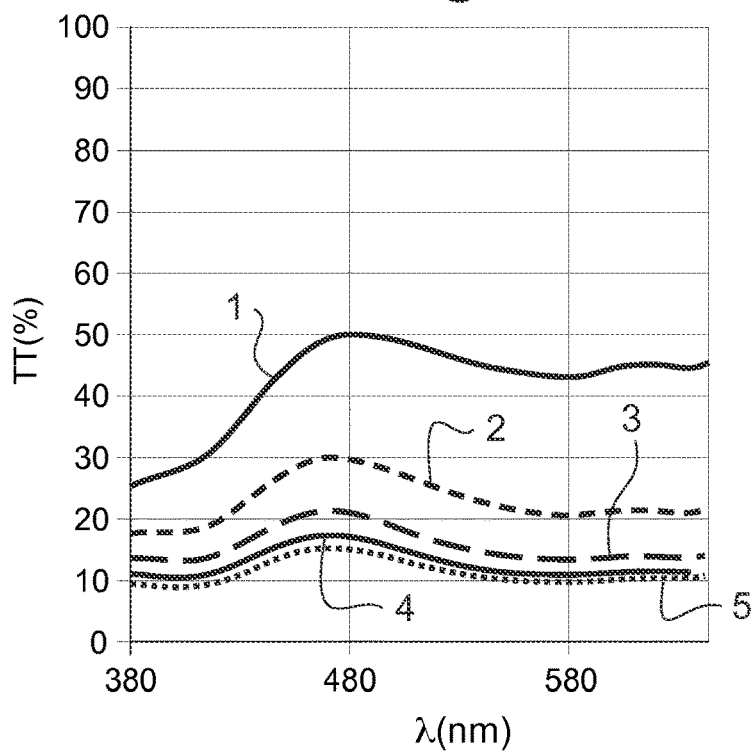
FIG. 12 shows a set of five curves corresponding to the total transmission TT as a function of the wavelength λ between 380 and 630 nm of the variable polarizer illuminated with a polarized light normal to r2.

FIG. 12 shows a set of five curves corresponding to the total transmission TT as a function of the wavelength λ between 380 and 630 nm of the variable polarizer illuminated with a polarized light normal to r2.

Curve 1 is the off mode (with a voltage U2 equal to 0 V).
Curve 2 is the on mode (with a voltage U2 equal to 20 V).
Curve 3 is the on mode (with a voltage U2 equal to 40 V).
Curve 4 is the on mode (with a voltage U2 equal to 60 V).
Curve 5 is the on mode (with a voltage U2 equal to 80 V).

The total transmission TT increases with the voltage applied.

Assembly Examples

Figure 13:
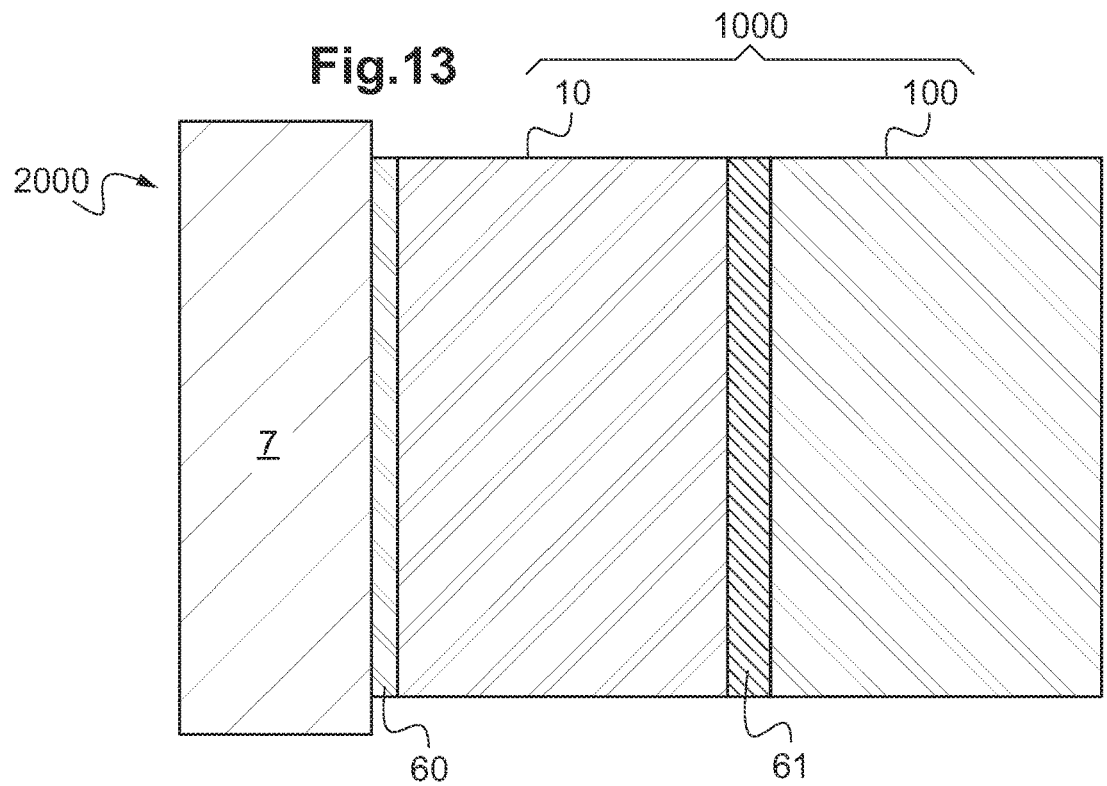
FIG. 13 shows a schematic sectional view of a glazing bearing an optical system 2000 according to the invention.

FIG. 13 shows a schematic sectional view of a glazed assembly 2000 comprising a transparent sheet 7 (any possible thickness) bearing an optical system 1000 according to the invention.

A static polarizer 10 is bonded by an optical glue 60 to the transparent glass or plastic (rigid for example) sheet 7 and also is bonded by an optical glue 61 to the variable polarizer 100.

For example, this is a partition (vertical position).

The assembly may form part of a multiple glazing (double or triple glazing). For a double glazing, the system 1000 can be on the face F1 side (external face by convention), F2, F3; F4 (internal face by convention). For a triple glazing, the stack may be on the face F1 side (external face), F2, F3; F4 (external face). The sheet 7 may be of the same dimension, or larger, than the system 1000.

The glazed assembly 2000 can be:

on the preferably external face of a shower wall or the element 7 is a shower wall on the preferably internal face (face 'F4') of a curved vehicle glazing, in particular in a motor vehicle: roof, side glazing, windscreen, rear window, or element 7 is the curved glazing In particular, the glazed assembly 2000 may serve as projection screen.

FIG. 14 shows a schematic sectional view of a laminated glazing 3000 bearing an optical system 1000 according to the invention comprising a static polarizer 10 linked with the variable polarizer 100 by an optical glue 60.

The laminated glazing 3000 comprises:
a first additional glass sheet 8 that is transparent
a thermoplastic, in particular EVA or PVB, lamination interlayer 70
a second additional glass 8' or transparent plastic sheet the main internal faces called F2 and F3 of the first and second additional sheets facing one another, the optical system 1000 being between the faces F2 and F3 and within the submillimetric lamination interlayer or of at most 2 mm During manufacture, it is possible to use three interlayer sheets: two full sheets 72,73 against the internal faces of the sheets 8,8' and a central sheet 71 with an opening for housing the system 1000. After lamination, the interface between sheets (symbolized by dots) is not necessarily discernible. It is preferred for the opening to be closed rather than entirely opening out on one side. Thus, the whole edge of the system 1000 is surrounded by lamination interlayer 70. Of course, for the power supply, connections can emerge from the system 1000 and even protrude beyond one or more side edges of the glazings.

Alternatively, it is possible to use two interlayer sheets, the central sheet with a hole not being necessary if the system 1000 is sufficiently thin, for example of a thickness of at most 0.2 mm.

One of the sheets 8 or 8' may be colorless or tinted (gray, green, bronze, etc.) and the other glazings may be clear or extra-clear 8' or 8. One of the first interlayer sheets can be tinted (gray, green, bronze, and the like) and the other(s) clear or extra-clear. One of the sheets 8 or 8' may be replaced by a plastic sheet such as a polycarbonate or a PMMA (in particular with a PU lamination interlayer).

The edge of the lamination interlayer 70 may be set back (by at most 5 mm, for example) from the edge of the sheets 8, 8'.

The system 1000 covers, for instance, virtually the whole of the main faces of the sheets 8 and herein is even centered. There is the same width of PVB on either side of the system 1000.

The glazings 8, 8' are planar or curved, the system 1000 being able to adapt to the curve(s) of the glass sheets which are in this case curved 8, 8'.

The optical system 1000 can be a partition or else a vehicle roof. For example, for a vehicle roof:
the sheet 8 is the outermost and curved, which is optionally tinted, for example 3 mm
the sheet 8' is the innermost, curved, preferably clear or extra-clear, for example 3 mm or thinner,
the lamination interlayer 70 is made of PVB which can be acoustic, in particular bilayer or trilayer (sheet 71 or 72 or 73).

The roof may therefore also be of color which can be varied, for example from dark blue to light blue, with the voltage U1 or U2.

FIG. 15 shows a schematic sectional view of a laminated glazing bearing an optical system 3000 according to the invention in a variant of FIG. 14, adding a polarization-sensitive electrically controllable device 20 in addition to variable polarizer 100 and static polarizer 10 and electrically controllable device glued to the static polarizer 10 by optical glue 60'.

In one variant, the static polarizer 10 is eliminated.

FIGS. 16 and 17 show, respectively, a front view and a schematic sectional view of a laminated glazing bearing an optical system 4000 according to the invention.

The laminated glazing 4000 differs from that of FIG. 14 in that the optical system 1000 covers a surface portion of the sheet 8, in particular a peripheral strip, for example along an upper longitudinal edge H over almost the entire length of the laminated glazing.

This is for example a motor vehicle windshield.

This optical system 1000 is in a marginal zone, wherein the criteria of LT and absence of haze are freer than in the central zone ZB.

This optical system 1000 may therefore also be of color which can vary, for example from dark blue to light blue, with the voltage.

As shown in FIG. 17 (cross sectional view), the width 7a of central interlayer 73 between the optical system 1000 and the lower longitudinal edge B is larger than the width 7b of central interlayer 73 between the optical system 1000 and the upper longitudinal edge H.

As a variant, or in addition, it may be present along a lower longitudinal edge B of the windscreen, over the whole length or a portion of the length.

As shown in FIG. 16 (front view of interior side of vehicle), the windscreen comprises a first opaque frame, for example made of enamel (black or other) 91' to 94' on the lateral and longitudinal edges of the free face (F4) 82' of the internal sheet 8' and a second opaque frame, for example made of enamel (black or other) 91 to 94 on the lateral and longitudinal edges of the free face (F1) 82 of the external sheet 8.

The edge face of the optical system 1000 which is on the side of the lower longitudinal edge, and even those on the side of the lateral edges, can be (facing) between the layers 92, 92', 93, 93', 94, 94' of the enamel frames. For example, the connections and other current-supplying strips (for U1 and U2) can also be masked by these layers 92, 92', 93, 93', 94, 94'.

In one variant, it is a motor vehicle roof, for example with the outer glass 8 which is tinted and/or the PVB 71 which is tinted and the optical system 1000 which covers substantially the entire main face of the glasses 8, 8'.

The invention claimed is:

1. A liquid crystal optical system comprising a variable polarization electro-switchable device forming a variable polarizer, the variable polarizer comprising:
    first and second transparent electrodes with an electric field between the first and second electrodes, the first and second electrodes are coplanar, forming an alternation of first and second electrically conductive strips at distinct potentials, the first and second electrically conductive strips being elongated in a direction r0;
    an electroactive layer made of a material comprising liquid crystals which are nematic and dichroic dyes;
    a first unidirectional planar anchoring layer in a direction r1 on a main face of the electroactive layer and on the first and second electrodes, and
    a second unidirectional planar anchoring layer in a direction r2 different from the direction r1,
    wherein the variable polarizer is devoid of a static polarizing film to controllably alter a polarization state of transmitted light and achieve said variable polarization.

2. The liquid crystal optical system according to claim 1, wherein the liquid crystals are twisted nematic in an off state of the variable polarizer.

3. The liquid crystal optical system according to claim 1, wherein the electric field is alternating.

4. The liquid crystal optical system according to claim 1, wherein the variable polarizer has first and second functional states and in the first functional state which is an off state, from an unpolarized incident light, the variable polarizer is able to deliver an output light with a first component of the electric field along a first axis and a second component of the electric field along a second axis normal to the first axis, with a first polarization ratio defined by:

$$rp1 = \frac{T1}{T1 + T2} \quad [\text{Math 5}]$$

rp1 being at least 70%, T1 being a total transmission at a wavelength between 380 and 800 nm along the first axis and T2 being a total transmission along the second axis at the wavelength between 380 and 800 nm and in the second functional state which is an on state:

from the non-polarized incident light, the variable polarizer being able to deliver an output light with a second polarization ratio defined by:

$$rp2 = \frac{T'2}{T'1 + T'2} \quad [\text{Math 4}]$$

rp2 is at least 30%,

T'1 being a total transmission at a wavelength between 380 and 800 nm along the first axis and T'2 being a total transmission along the second axis at the wavelength between 380 and 800 nm for a non-zero voltage between the first and second electrodes.

5. The liquid crystal optical system according to claim 1, wherein r1 forms an angle of 90°±15° with r2:

r0 forms an angle of at most 15° with r1 and the liquid crystals have positive dielectric anisotropy, or r0 forms an angle of 90°±15° with r1 and the liquid crystals have negative dielectric anisotropy.

6. The liquid crystal optical system according to claim 1, comprising a static polarizer facing said variable polarizer.

7. The liquid crystal optical system according to claim 1, wherein the variable polarizer and a static polarizer or an electrically controlled polarization-sensitive device are disjoint or linked by a transparent bonding layer, or wherein the variable polarizer comprises an element bearing the first and second electrodes which forms said static polarizer.

8. The liquid crystal optical system according to claim 1, comprising, face to face with the variable polarizer, an electrically controllable polarization-sensitive device the electrically controllable polarization-sensitive device is a variable-scattering electrically controllable device using nematic liquid crystals.

9. The liquid crystal optical system according to claim 8, wherein nematic liquid crystals comprises focal conic domains.

10. The liquid crystal optical system according to claim 9, wherein said variable-scattering electrically controllable device using liquid crystals comprising an electroactive layer with the liquid crystals and with a direction b forming an angle of 0°±15° or of 90°±15 with a polarization P1 of an output light in the off state of the variable polarizer.

11. A laminated glazing comprising:

a first additional glass sheet that is transparent;

a thermoplastic lamination interlayer;

a second additional glass or transparent plastic sheet, a liquid crystal optical system according to claim 1, and main internal faces of the first and second additional glass sheets facing one another, the liquid crystal optical system being between the main internal faces of the first and second additional glass sheets.

12. A vehicle glazing bearing the optical system according to claim 1.

13. A glazing for a building bearing the optical system according to claim 1.

14. The liquid crystal optical system according to claim 1, wherein the first and second electrodes are elongate in a direction r0.

15. The liquid crystal optical system according to claim 1, wherein the first component of the electric field along the first axis is normal to r1 and the second component of the electric field along the second axis is parallel to r1.

16. The liquid crystal optical system according to claim 5, wherein r1 forms an angle of 90°±5° with r2:

r0 forms an angle of at most 5° with r1 and the liquid crystals have positive dielectric anisotropy, or r0 forms an angle of 90°±5° with r1 and the liquid crystals have negative dielectric anisotropy.

17. The liquid crystal optical system according to claim 7, wherein the transparent bonding layer is an optical glue or a thermoplastic layer.

18. The liquid crystal optical system according to claim 8, wherein the electrically controllable polarization-sensitive device is a variable-scattering electrically controllable device using nematic liquid crystals.

19. The liquid crystal optical system according to claim 7, wherein the electroactive layer is arranged between the first unidirectional planar anchoring layer and the second unidirectional planar anchoring layer.

* * * * *